United States Patent [19]
Takahashi et al.

[11] Patent Number: 6,144,756
[45] Date of Patent: Nov. 7, 2000

[54] FINGER VERIFICATION SYSTEM

[75] Inventors: Yasuo Takahashi; Masami Aizawa; Takuji Kimura, all of Yokohama, Japan

[73] Assignee: Kabushiki Kaisha Toshiba, Kawasaki, Japan

[21] Appl. No.: 09/010,026

[22] Filed: Jan. 21, 1998

[30]        Foreign Application Priority Data

Jan. 23, 1997   [JP]   Japan .................................. 9-010526

[51] Int. Cl.⁷ ..................................................... G06K 9/00
[52] U.S. Cl. ...................... 382/124; 382/126; 340/825.34
[58] Field of Search ........................... 382/115, 124–127; 340/825.3, 825.31, 825.34

[56]               References Cited

U.S. PATENT DOCUMENTS

| | | |
|---|---|---|
| 3,781,855 | 12/1973 | Killen . |
| 4,467,545 | 8/1984 | Shaw, Jr. . |
| 4,792,226 | 12/1988 | Fishbine et al. ........................ 382/126 |
| 4,857,916 | 8/1989 | Bellin . |
| 5,546,471 | 8/1996 | Merjanian . |
| 5,559,504 | 9/1996 | Itsumi et al. .......................... 340/825.3 |

FOREIGN PATENT DOCUMENTS

| | | |
|---|---|---|
| 0387522 | 2/1990 | European Pat. Off. . |
| 0735502 | 1/1996 | European Pat. Off. . |
| 7168930 | 7/1995 | Japan . |

*Primary Examiner*—Bhavesh Mehta
*Attorney, Agent, or Firm*—Pillsbury Madison & Sutro LLP

[57]                 ABSTRACT

Two grooves are provided on a rear face of the remote control transmission apparatus and a plurality of electrodes are arranged in the grooves in substantially the same direction as an extension direction thereof. The plurality of the electrodes are connected to a conversion device. The conversion device measures an impedance between each of the electrodes and the finger placed in the groove, codes that impedance distribution pattern and transmits it to a recognition device. The recognition device determines whether or not he is a particular registered person by verifying with a preliminarily stored registration pattern and controls availability of a pay channel according to the determination result.

9 Claims, 30 Drawing Sheets

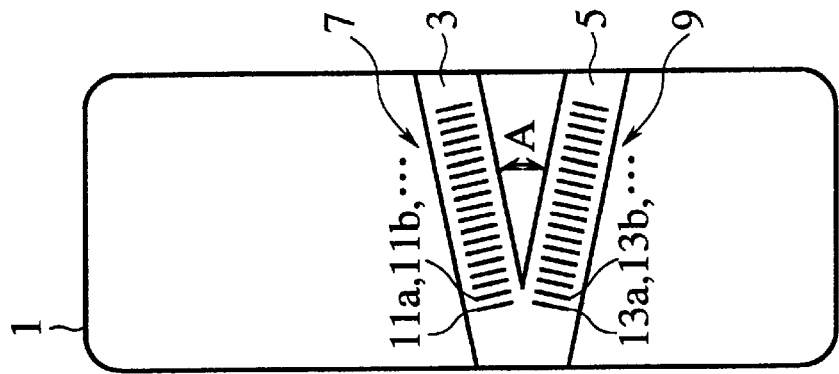
FIG.3C REAR FACE
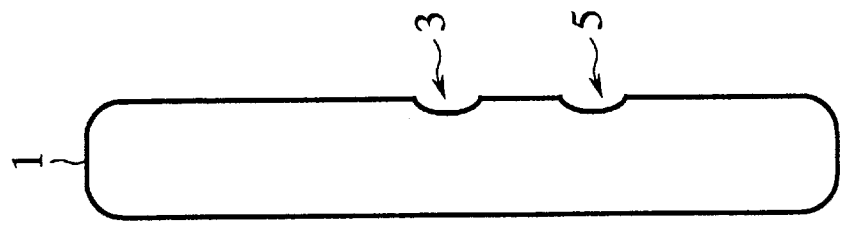
FIG.3B SIDE FACE
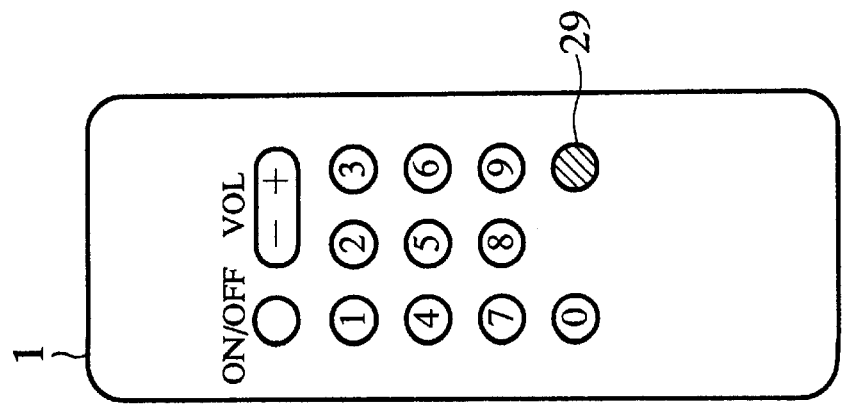
FIG.3A FRONT FACE

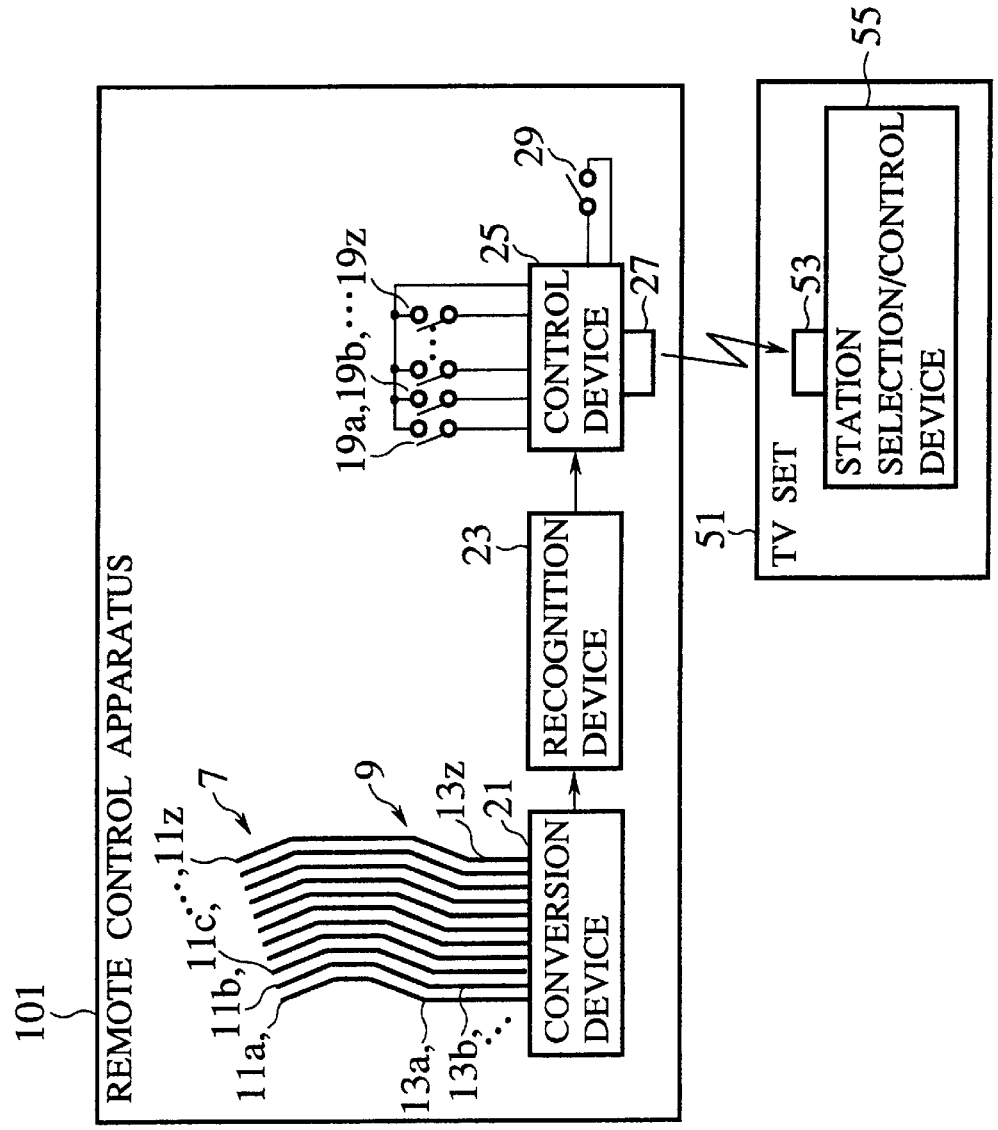

LEFT HAND    RIGHT HAND

LEFT HAND    RIGHT HAND

ONLY LEFT HAND

ONLY RIGHT HAND

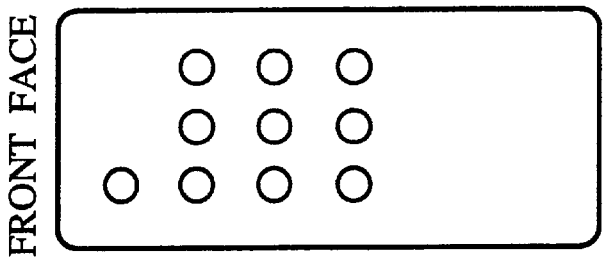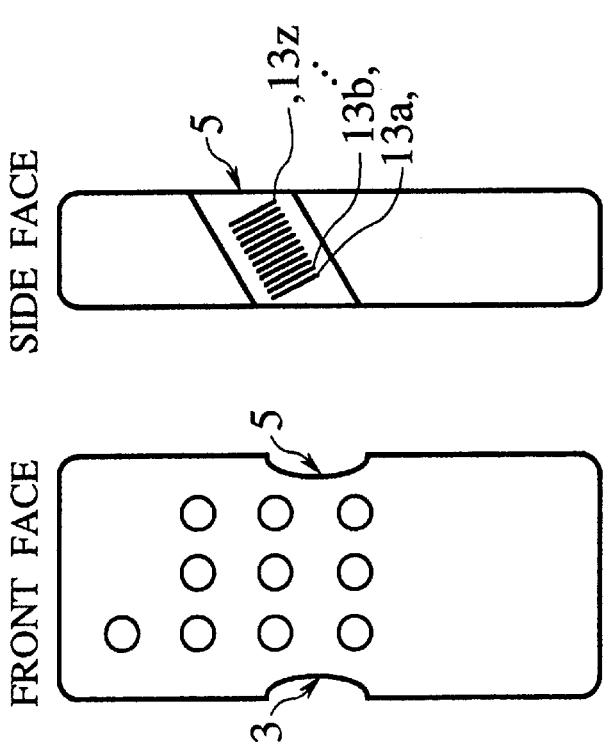

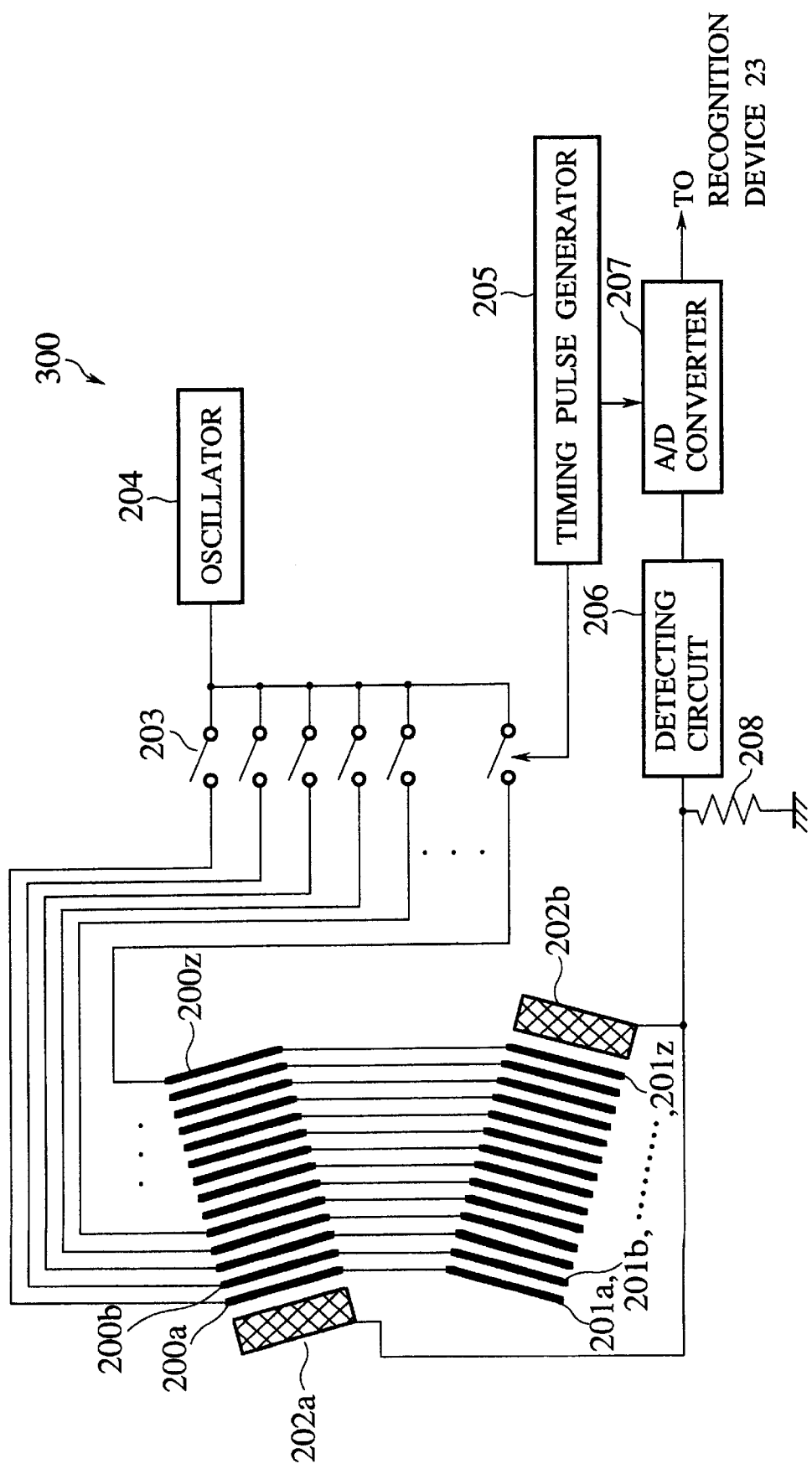

REAR FACE

SIDE FACE

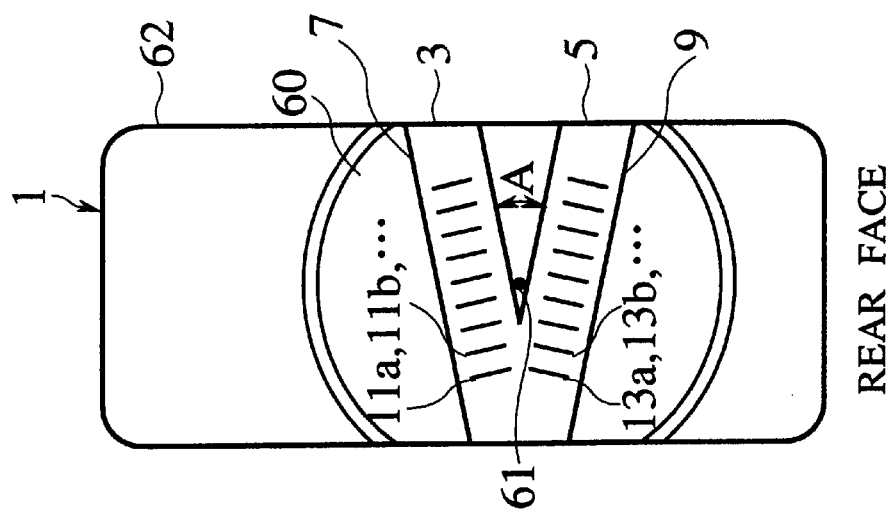
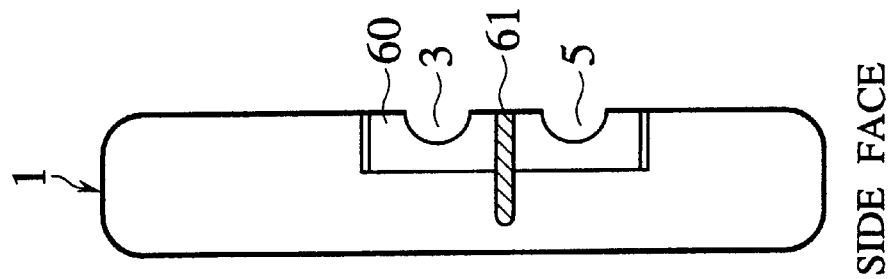
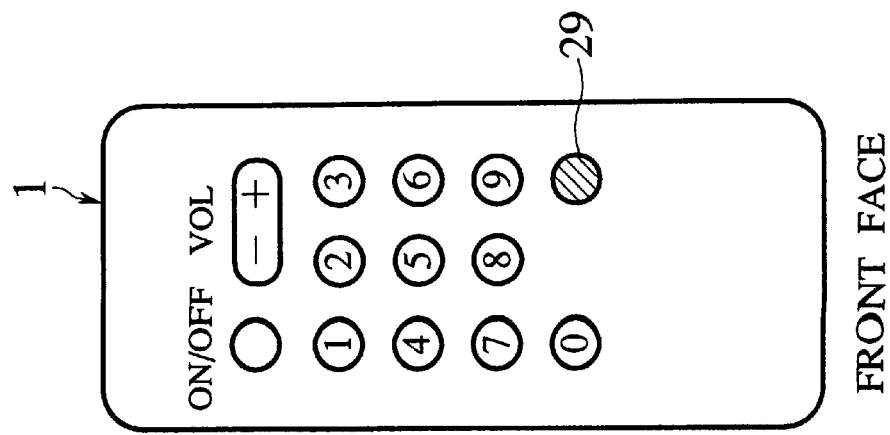

(CASE IN WHICH ELECTROSTATIC CAPACITY IS USED)

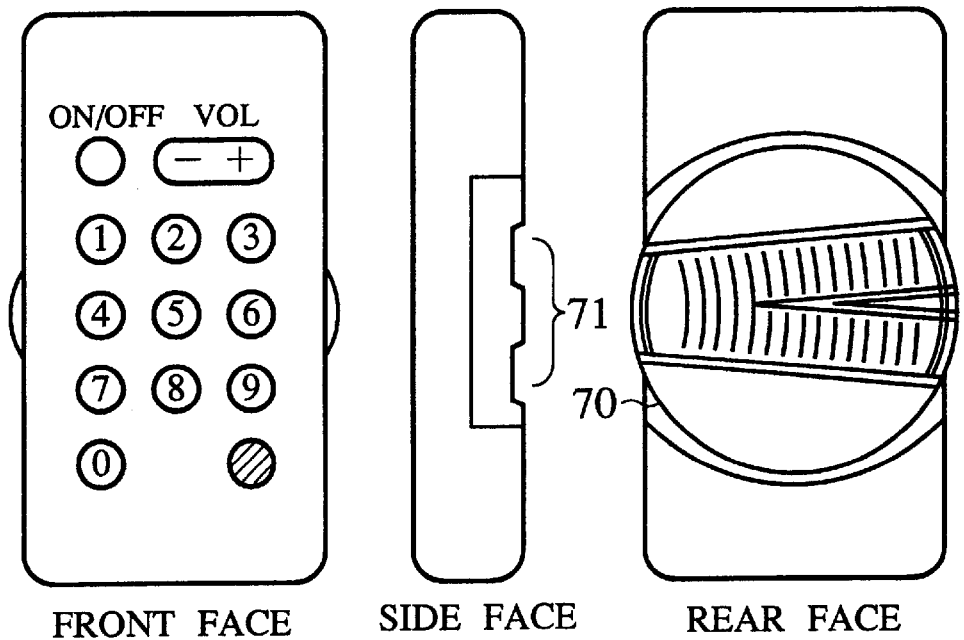
FIG. 20A FRONT FACE
FIG. 20B SIDE FACE
FIG. 20C REAR FACE
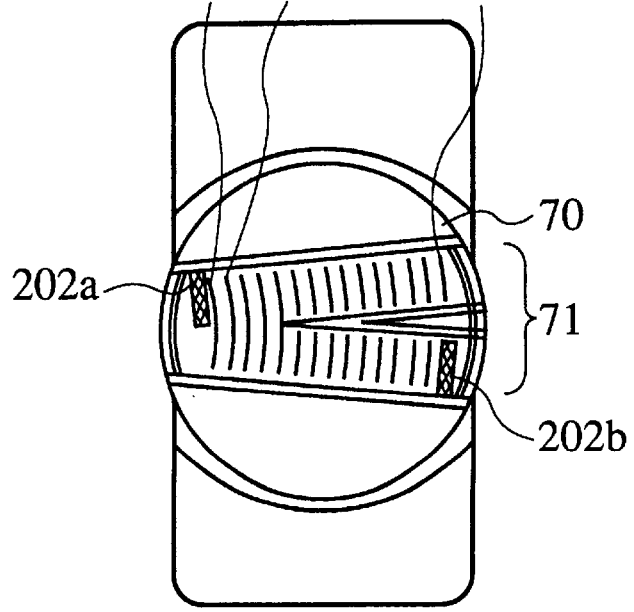
FIG. 20D REAR FACE
(CASE IN WHICH ELECTROSTATIC CAPACITY IS USED)

REAR FACE OF MAIN BODY
(CASE IN WHICH ELECTROSTATIC CAPACITY IS USED)

REAR FACE OF MAIN BODY

SIDE FACE OF MAIN BODY

SIDE FACE

FRONT FACE

REAR FACE

REAR FACE

PERSPECTIVE VIEW

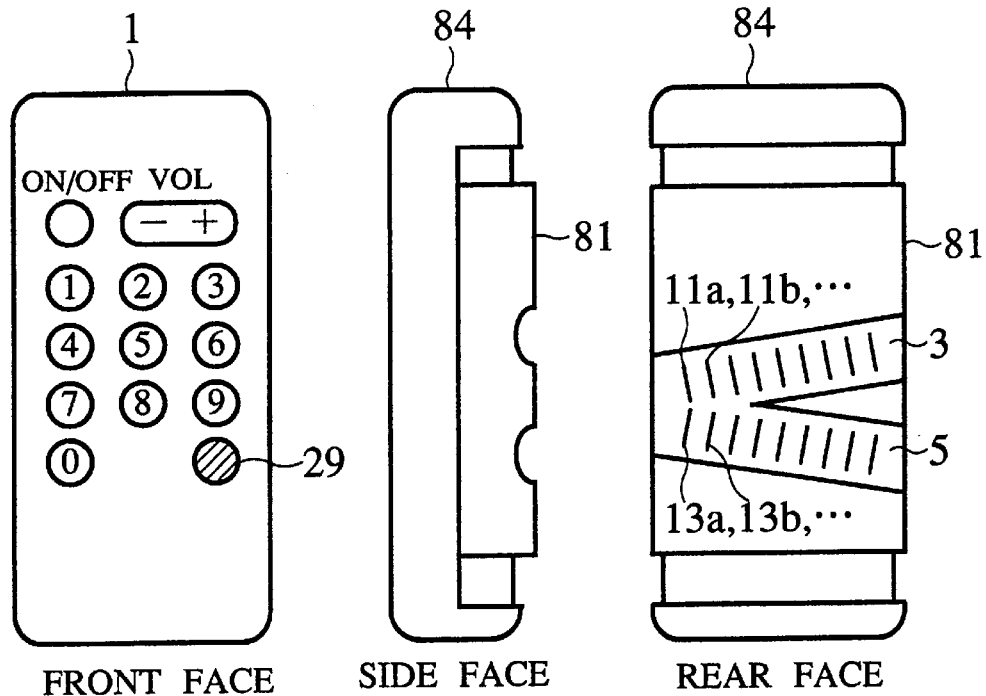
FIG.23A FRONT FACE
FIG.23B SIDE FACE
FIG.23C REAR FACE
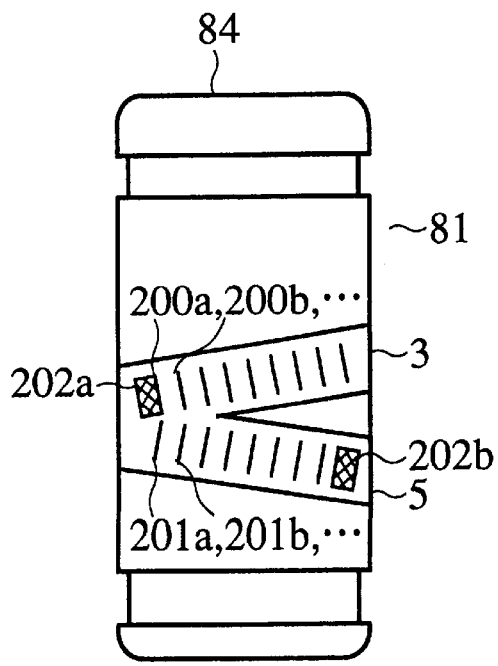
FIG.23D
REAR FACE
(CASE IN WHICH ELECTROSTATIC CAPACITY IS USED)

FIG.24A
FIG.24B
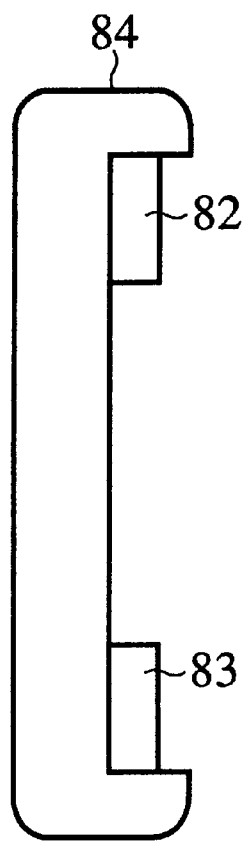
SIDE FACE OF
MAIN BODY
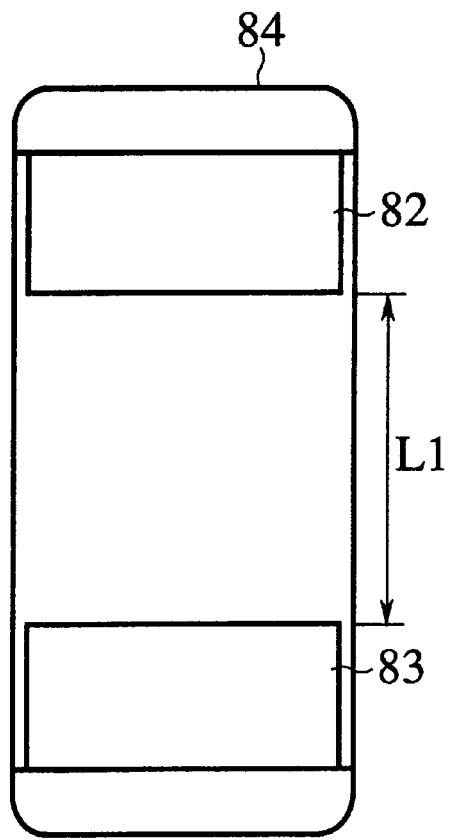
REAR FACE OF
MAIN BODY

CASE IN WHICH ELECTROSTATIC CAPACITY IS USED

FRONT FACE   SIDE FACE   REAR FACE

REAR FACE
(CASE IN WHICH
ELECTROSTATIC CAPACITY IS USED)

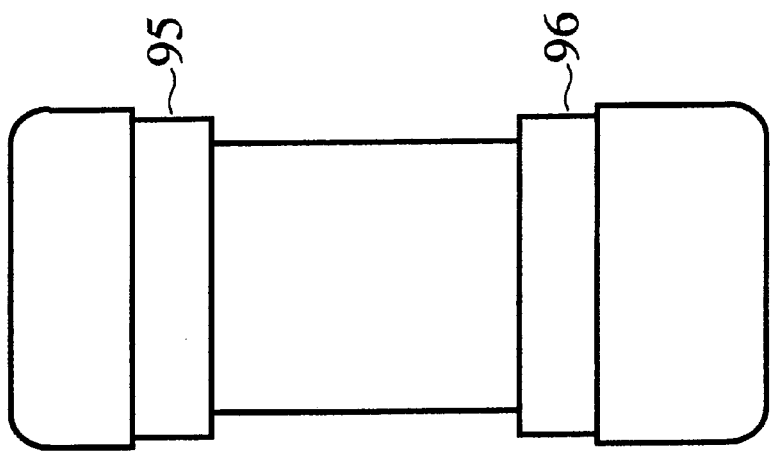
FIG.28C  REAR FACE
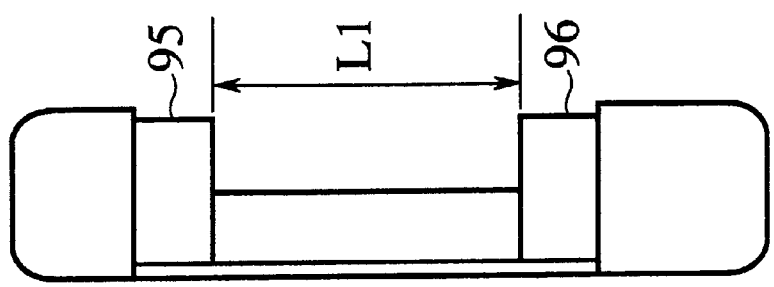
FIG.28B  SIDE FACE
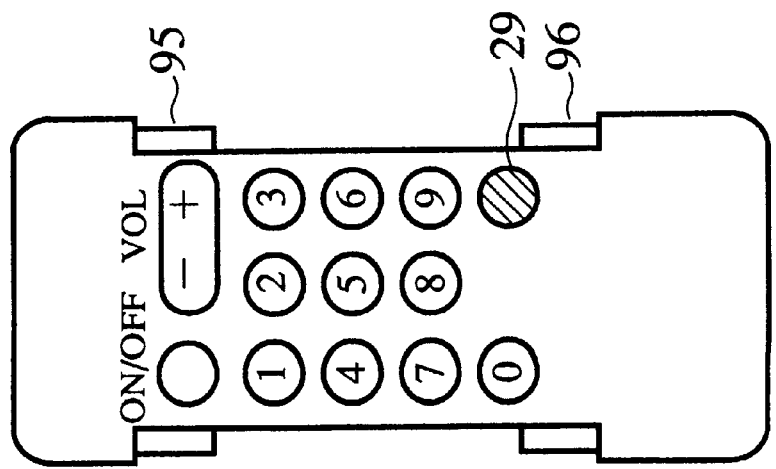
FIG.28A  FRONT FACE

FINGER VERIFICATION SYSTEM

BACKGROUND OF THE INVENTION

1. Field of the Invention

This invention relates to a finger verification system which recognizes a particular person according to an impedance distribution pattern obtained when the finger makes contact with an electrode face formed with a plurality of electrodes, based on a fact that the shape of an articulation of the finger differs between person to person.

2. Description of the Prior Art

As a personal recognition system for recognizing a person depending on his physical features, various systems by fingerprint verification, voice print verification, retina blood vessel verification, handwritten signature and the like have been well known.

In recent years, a finger verification system based on electric resistance pattern by finger contact has been developed, so that reduction of verification time, achievement of a small size of the verification apparatus, massive cost reduction and the like have been realized as compared to a conventional personal recognition system. And its application field is expected to expand in the future.

FIG. 1 is a block diagram showing structures of a remote control transmission apparatus (hereinafter referred to as remote control apparatus) of television set (hereinafter referred to as TV set) using the conventional finger verification system and the TV set. According to the conventional example, a particular person is recognized according to information related to a shape of the finger which is in contact with the rear face of the remote control apparatus and a permission for access to a pay channel is dispatched thereby preventing infants from playing with channel change.

Referring to FIG. 1, the rear face of the remote control apparatus has an electrode face 43 in which a plurality of linear electrodes 41a, 41b, 41c, . . . 41z are disposed in parallel to each other. The respective electrodes 41a–41z composing the electrode face 43 are connected to a conversion device 21. With a minute voltage applied between the respective electrodes 41a–41z, electric resistance between the adjacent electrodes is measured and this resistance value is coded by the conversion device 21.

The coded information is transmitted to a recognition device 23 and verified with information of a particular person P already registered. If the recognition device 23 recognizes that the finger making contact with the rear face of the remote control apparatus 101 is a finger of a subscriber or a particular person P, the recognition device 23 outputs a permission information to a control device 25.

Then, if the particular person P selects a pay channel button 29, a control signal for instructing to select the pay channel is transmitted from a infrared ray emitting portion 27 of the control device 25 to a infrared ray receiving portion 53 of a station selection/control device 55 of a TV set 51. Consequently, the pay channel is selected by the station selection/control device 55. Because even if other person than the particular person touches the remote control apparatus 101, the recognition device 23 does not dispatch permission information, he cannot watch or listen to the pay channel.

However, because in the above conventional finger verification system, a resistance pattern is detected by an electrode face composed of a single group of electrodes provided on the rear face of the remote control apparatus, if a left-handed person grips the remote control apparatus with a left hand, this finger verification system is not capable of making accurate personal recognition.

Further, because the electrode face is provided on only the rear face of the remote control apparatus, there is a case that a proper operator is not recognized to be a subscriber particular person, depending on a way of gripping the remote control apparatus. For example, if the remote control apparatus is gripped in a style shown in FIG. 2 and a button is pressed by a forefinger, the side face of the remote control apparatus is gripped with the thumb and middle finger, so that the electrode face on the rear face thereof is not contacted by the finger. Therefore, the person is not recognized.

Further, because nothing is notified the operator of even if personal recognition succeeds, he does not feel that he has been recognized so that the pay channel is available. There is a possibility that the pay channel contains information inappropriate for children. For example, if a subscriber presses the pay channel button by mistake when he is watching TV together with his children, they happen to know a presence of the pay channel.

SUMMARY OF THE INVENTION

Accordingly, it is an object of the present invention to provide a finger verification system capable of carrying out personal recognition regardless of operator's gripping style.

Further, it is another object thereof to provide a finger verification system excellent in user interface, which notifies that he has been automatically recognized so as to prevent him from operating the apparatus improperly.

To achieve the above object, there is provided a finger verification system comprising: a case having a plurality of grooves disposed on a rear face thereof; a plurality of electrode faces which are provided in each of the plurality of the grooves and formed with a plurality of electrodes arranged in the same direction as an extension direction of the plurality of the grooves; and a recognition means for, when a finger makes a contact with any of the plurality of the electrode faces, recognizing a particular person related to the finger according to an impedance distribution pattern group obtained by measurement based on the plurality of the electrodes.

According to a preferred embodiment thereof, the number of the plurality of the grooves is two and an angle formed by the plurality of the grooves is 5°–30°.

According to another preferred embodiment thereof, the case is provided with the plurality of the grooves on a rear face thereof and contains a rotary body rotatable around a shaft vertical to the rear face.

According to still another preferred embodiment thereof, the above finger verification system further comprises a spring-back mechanism which positions the rotary body at a predetermined position under no load condition and when a load is applied in any direction of normal and reverse directions, rotates the rotary body in the direction of the load from the predetermined position and when the load is removed, returns the rotary body to the predetermined position.

Further, there is provided a finger verification system comprising: a case containing grooves disposed on each of two side faces; two electrode faces which are provided in each of the grooves and formed with a plurality of the electrodes arranged in the same direction as an extension direction of the grooves; and a recognition means for, when a finger makes a contact with any of the two electrode faces, recognizing a particular person related to the finger according to an impedance distribution pattern group obtained by measurement using the plurality of the electrodes.

Still further, there is provided a finger verification system comprising: electrode faces in which a plurality of electrodes are arranged in parallel to each other; a conversion means which, when a finger is placed on the plurality of the electrodes, measures impedance values between each of the plurality of the electrodes and the finger and converts the impedance values to information indicating a series of the impedance values; a recognizing means for recognizing whether or not a person related to the finger is a particular person preliminarily registered according to information indicating the series of the impedance value; a notifying means for notifying that the particular person has been recognized by the recognizing means; a response confirmation means for determining whether or not a predetermined response is inputted within a first predetermined time interval since a notification from the notifying means; and a control means for, when it is determined that the predetermined response is inputted within the first predetermined time interval by the response confirmation means, controlling so as to enable a predetermined operation within a second predetermined time interval.

Yet still further, there is provided a finger verification system comprising: electrode faces in which a plurality of electrodes are arranged in parallel to each other; a conversion means which, when a finger is placed on the plurality of the electrodes, measures impedance values between each of the plurality of the electrodes and the finger and converts the impedance values to information indicating a series of the impedance values; a recognizing means for recognizing whether or not a person related to the finger is a particular person preliminarily registered according to information indicating the series of the impedance value; a notifying means for notifying that the particular person has been recognized by the recognizing means; and a control means which, when a predetermined operation is not carried out within a third predetermined time interval since a notification by the notifying means, performs a predetermined control.

According to a preferred embodiment of the present invention, the notifying means notifies that the particular person has been recognized by dispatching light or sound.

Still further, there is provided a finger verification system comprising: a storage means for storing information of operating function specified for each person; electrode faces in which a plurality of electrodes are arranged in parallel to each other; a conversion means which, when a finger is placed on the plurality of the electrodes, measures impedance values between each of the plurality of the electrodes and the finger and converts the impedance values to information indicating a series of the impedance values; a recognizing means for recognizing whether or not a person related to the finger is a particular person preliminarily registered according to information indicating the series of the impedance value; and a control device which, when the particular person is recognized by the recognizing means, controls so that the operating function specified for the particular person is achieved with reference to the information about the operating function stored in the storage means.

Still further, there is provided a finger verification system comprising: a case which contains a rotary body which has a plurality of holes and is rotatable around a shaft vertical to a rear face thereof, the case having a plurality of electrode faces formed with a plurality of electrodes which form a part of concentric circles on a rear face thereof under the rotary body; and a recognition means which, when a finger makes contact with any of the plurality of the electrode faces, recognizes a particular person related to the finger according to an impedance distribution pattern group obtained by measurement using the plurality of the electrodes.

According to a preferred embodiment of the present invention, the above finger verification system further comprises a spring-back mechanism which positions the rotary body at a predetermined position under no load condition and when a load is applied in any direction of normal and reverse directions, rotates the rotary body in the direction of the load from the predetermined position and when the load is removed, returns the rotary body to the predetermined position.

Still further, there is provided a finger verification system comprising: a case which has a plurality of grooves on rear and side faces thereof and a movable portion movable in a length direction; a plurality of electrode faces which are provided in each of the plurality of the grooves and formed with a plurality of the electrodes arranged in the same direction as an extension direction of the plurality of the grooves; and a recognition means which, when a finger makes contact with any of the plurality of the electrode faces, recognizes a particular person related to the finger according to an impedance distribution pattern group obtained by measurement using the plurality of the electrodes.

According to a preferred embodiment of the present invention, the above finger verification system further comprises a sliding mechanism for positioning the movable portion gradually in the length direction.

The nature, principle and utility of the invention will become more apparent from the following detailed description when read in conjunction with the accompanying drawings.

BRIEF DESCRIPTION OF THE PREFERRED EMBODIMENTS

In the accompanying drawings:

FIGS. 3A–3C are appearance diagrams showing the remote control apparatus having the finger verification system according to a first embodiment of the present invention;

FIG. 4 is a circuit block diagram showing the finger verification system according to the first embodiment of the present invention and an electric portion of TV set;

FIGS. 6A, 6B are diagrams showing the remote control apparatus having the finger verification system according to a modification of the first embodiment of the present invention;

FIGS. 7A, 7B are diagrams showing the remote control apparatus having the finger verification system according to another modification of the first embodiment of the present invention;

FIG. 14 is a circuit block diagram showing an embodiment using impedance distribution measurement in the remote control apparatus having the finger verification system according to the present invention;

FIGS. 17A–17C are appearance diagrams showing the remote control apparatus having the finger verification system according to a fifth embodiment of the present invention;

FIGS. 20A–20D are appearance diagrams showing the remote control apparatus according to a modification of the fifth embodiment;

FIGS. 23A–23D are appearance diagrams showing the remote control apparatus having the finger verification system according to a sixth embodiment of the present invention;

FIGS. 24A, 24B are appearance diagrams showing a shape of the main body of the remote control apparatus according to the sixth embodiment;

FIGS. 28A–28C are appearance diagrams showing a shape of the main body of the remote control apparatus according to a modification of the sixth embodiment;

DESCRIPTION OF THE PREFERRED EMBODIMENTS

The embodiments of the present invention will be described with reference to the accompanying drawings.

[First embodiment]

Figure 1:
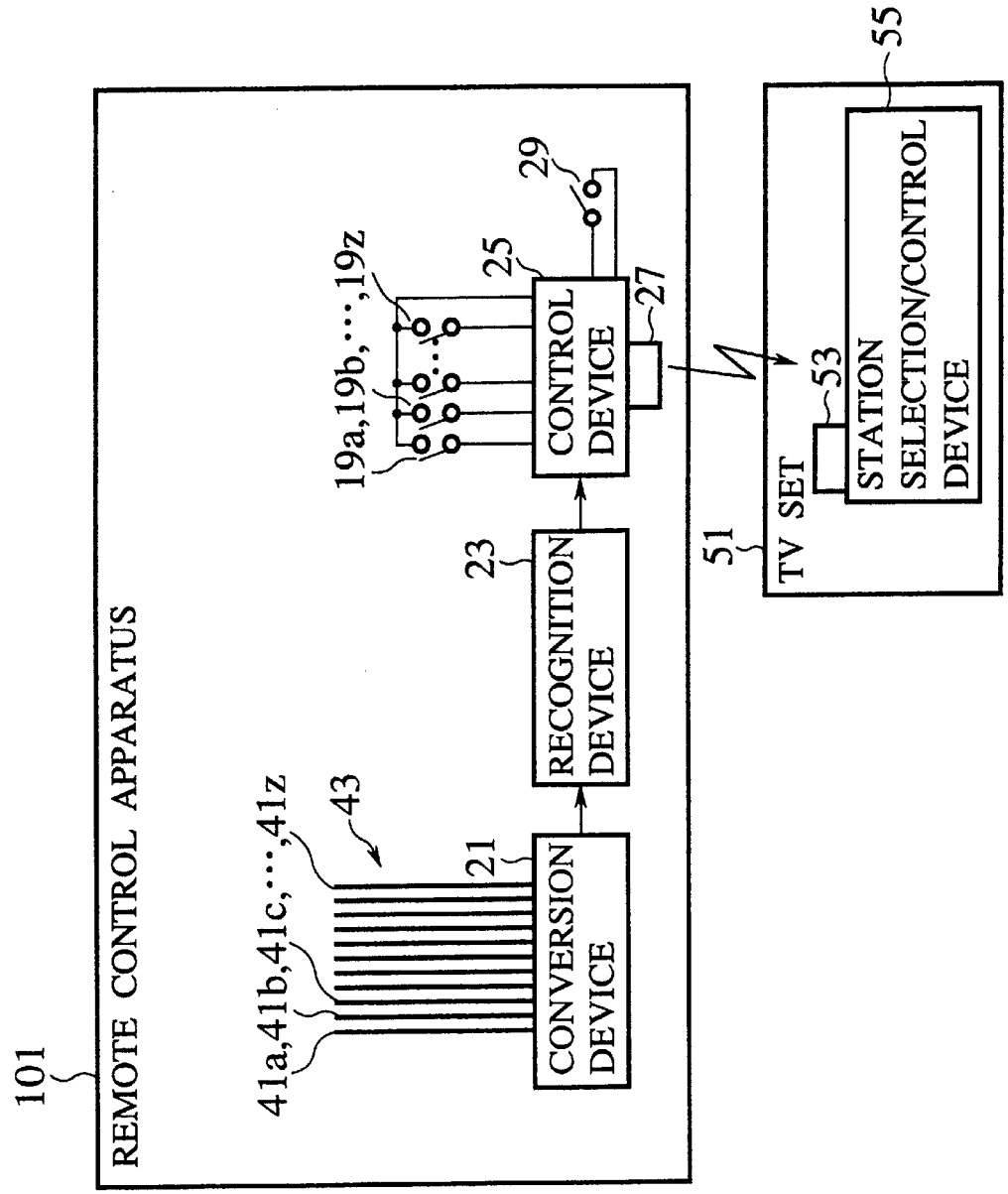
FIG. 1 is a circuit block diagram showing a remote control apparatus having a conventional finger verification system.

FIGS. 3A–3C show an appearance of a remote control apparatus employing a finger verification system according to a first embodiment of the present invention. FIG. 4 is a block diagram showing an electric circuit of the remote control apparatus and a television set. The same reference numerals as in FIG. 1 are attached to the same components having the same function as a conventional remote control apparatus. In this embodiment, the forefinger is used for finger verification.

FIGS. 3A–3C show the front, side and rear faces of the remote control apparatus 1 for remote-controlling the television set (hereinafter referred to as TV set) (not shown).

As shown in FIG. 3A, the front face of the remote control apparatus 1 contains ON/OFF button for turning on/off the power of the TV set, VOL +/− button for adjusting sound volume, ten-key (1-0) button for selecting a channel, and a pay channel button 29.

As shown in FIGS. 3B, 3C, two grooves 3, 5 are formed obliquely at different angles on the rear face of the remote control apparatus 1 while the grooves 3, 5 have electrode faces 7, 9 respectively.

The electrode faces 7, 9 have a plurality of linear electrodes 11a, 11b, 11c, . . . 11z and a plurality of linear electrodes 13a, 13b, 13c, . . . 13z in a substantially perpendicular direction to the extension of each groove.

FIG. 4 is a block diagram showing the remote control apparatus and TV set. Referring to FIG. 4, the remote control apparatus 1 comprises a plurality of the electrodes 11a, 11b, 11c, . . . 11z constituting the electrode face 7, a plurality of the electrodes 13a, 13b, 13c, . . . 13z constituting the electrode face 9, a conversion device 21, a recognition device 23 and a control device 25.

To the control device 25 are connected buttons 19a–19z including the ON/OFF button, VOL +/− button, and the ten-key button and the like, the pay channel button 29 and an infrared ray emitting portion 27.

The TV set 51 controlled by the remote control apparatus 1 contains an infrared ray receiving portion 53 and a station selection/control device 55.

The pluralities of the electrodes provided on the electrode faces 7, 9 on the rear face of the remote control apparatus 1 are connected such that the corresponding electrodes 11a and 13a, 11b and 13b, 11c and 13c, . . . 11z and 13z are connected to each other and they are connected to the conversion device 21.

A fine voltage is applied between the electrodes 11a (13a) and 11z(13z) so as to measure an electric resistance between adjacent electrodes and this resistance value is coded by the conversion device 21.

The coded information is transmitted to the recognition device 23 and verified with particular personal information registered in a memory unit (not shown) provided in the recognition device 23. If the recognition device 23 recognizes a finger contacting the rear face of the remote control apparatus 1 to be a finger of a particular person P who is a subscriber, the recognition device 23 transmits a permission information to the control device 25.

If a particular person P selects the pay channel button 29, a control signal for selecting the pay channel is transmitted from the infrared ray emitting portion 27 of the control device 25 to the infrared ray receiving portion 53 of the TV set 51 and then the station selection/control device 55 selects a pay channel. Naturally, if other person than the particular person P touches the remote control 1, the recognition device 23 does not transmit the permission information, and therefore the pay channel cannot be watched or listened to.

When any button 19a–19z other than the pay channel button 29 is pressed, a control signal corresponding to that button is transmitted from the infrared ray emitting portion 27 of the control device 25 to the infrared ray receiving portion 53 of the TV set 51 so as to perform a corresponding control like the conventional remote control apparatus.

For remote control of the remote control apparatus 1 and TV set 51, the transmission medium is not restricted to infrared ray but it is permissible to use visible ray, ultraviolet ray, supersonic wave, electronic wave or the like.

FIGS. 5A–5D show four types of ways for griping the remote control apparatus which can be considered when it is operated by a single hand or both hands. When the remote control apparatus 1 is operated with the forefinger placed thereunder as shown in the same figure, the forefinger of the right hand is embedded in the groove 3 and the forefinger of the left hand is embedded in the groove 5. The reason why the angles of the grooves 3, 5 are different from each other is that the hand structure of a person is taken into account as described above.

According to the present embodiment, a groove considering a structure of a man's hand is provided on the rear face of the remote control apparatus and the electrode face is provided on the surface of this groove. Thus, just when the remote control apparatus is gripped, the finger makes a contact with the electrode, so that user does not feel that his finger is verified and thus does not feel a stress.

Figure 2:
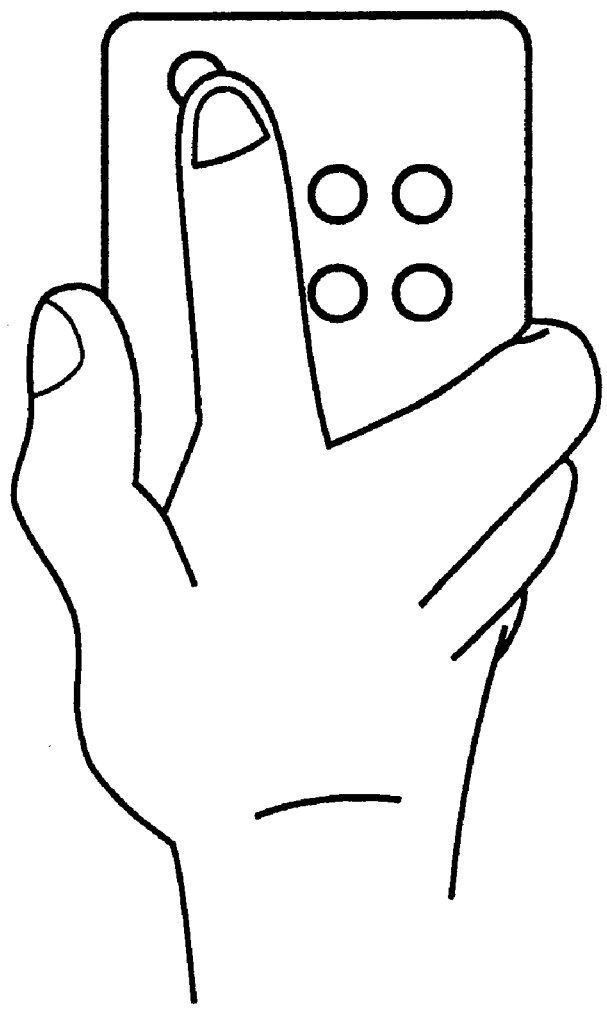
FIG. 2 is a diagram for explaining a problem of the remote control apparatus having the conventional finger verification system.
Figure 5A:
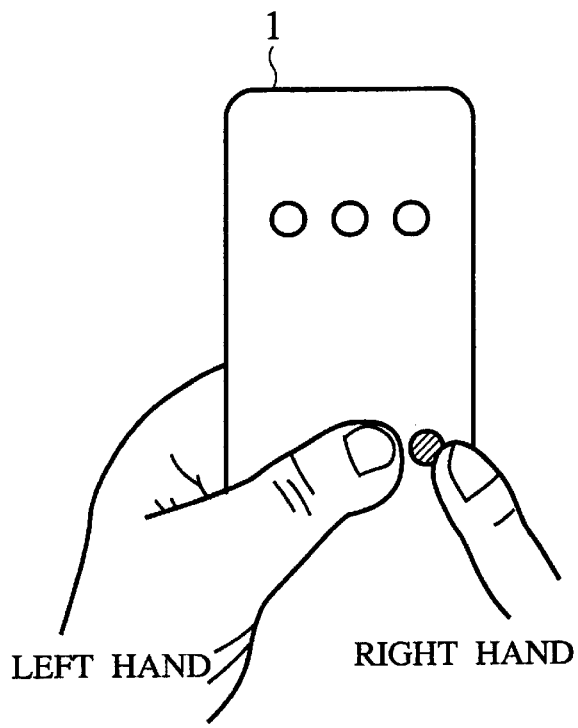
FIGS. 5A–5D are diagrams for explaining use conditions of the remote control apparatus having the finger verification system according to the first embodiment of the present invention.
Figure 5B:
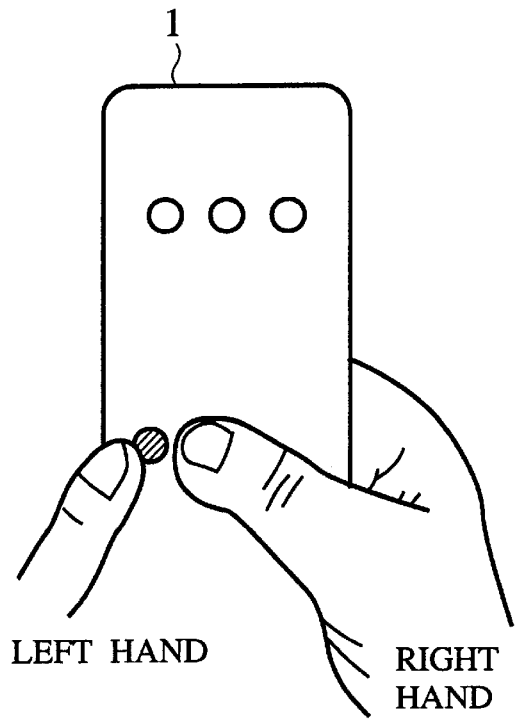
Figure 5C:
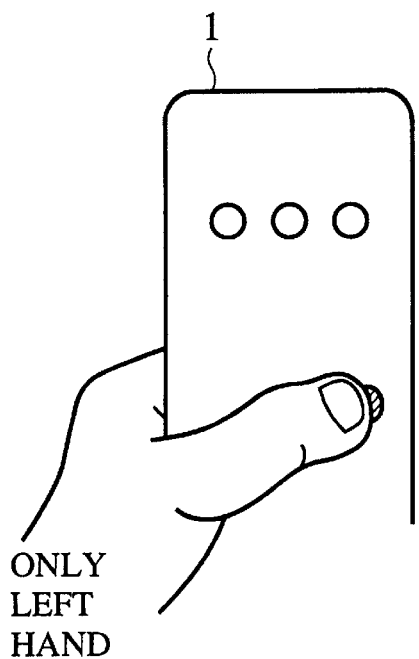
Figure 5D:
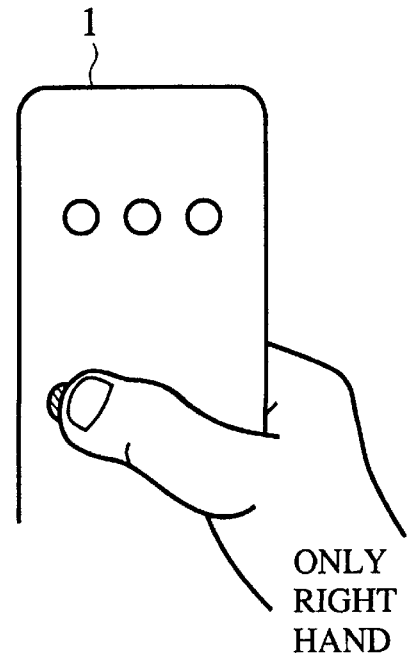

This embodiment relates to a configuration of the remote control apparatus and allocation of the electrodes thereof, and various applications can be considered. FIGS. 6A, 6B and 7A, 7B show application examples. FIGS. 6A, 6B show cases in which the body of the remote control apparatus is supported by other fingers than the forefinger and the forefinger is used for controlling the button as shown in FIG. 2. Because the middle finger is in contact with the side face of the remote control apparatus, the grooves 3, 5 and the electrodes 11a–11z, 13a–13z are provided on this portion. The right and left side faces have grooves to allow recognition of both the right and left hands. The other structure is just the same as the first embodiment.

FIGS. 7A, 7B show a case of preventing the remote control apparatus from being operated while placed on a table. By forming the shape of the rear face thereof in a convex formation, the remote control apparatus is difficult to operate.

Figure 8A:
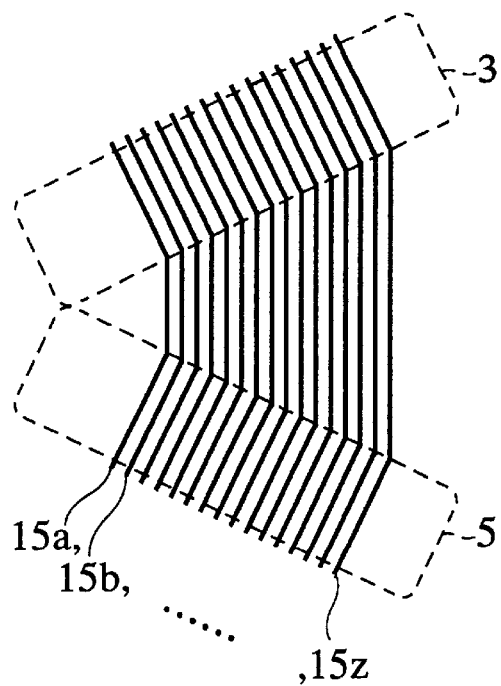
FIGS. 8A, 8B are diagrams showing the remote control apparatus having the finger verification system according to still another modification of the first embodiment of the present invention.
Figure 8B:
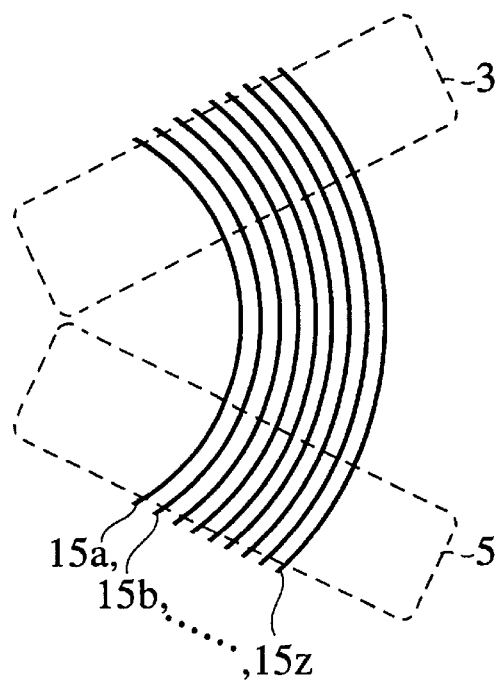

Although the electrode faces of each groove are formed with the electrodes 11a–11z and electrodes 13a–13z according to the present embodiment, it is permissible to form a single electrode face using curved electrodes 15a–15z as shown in FIGS. 8A, 8B.

Figure 9:
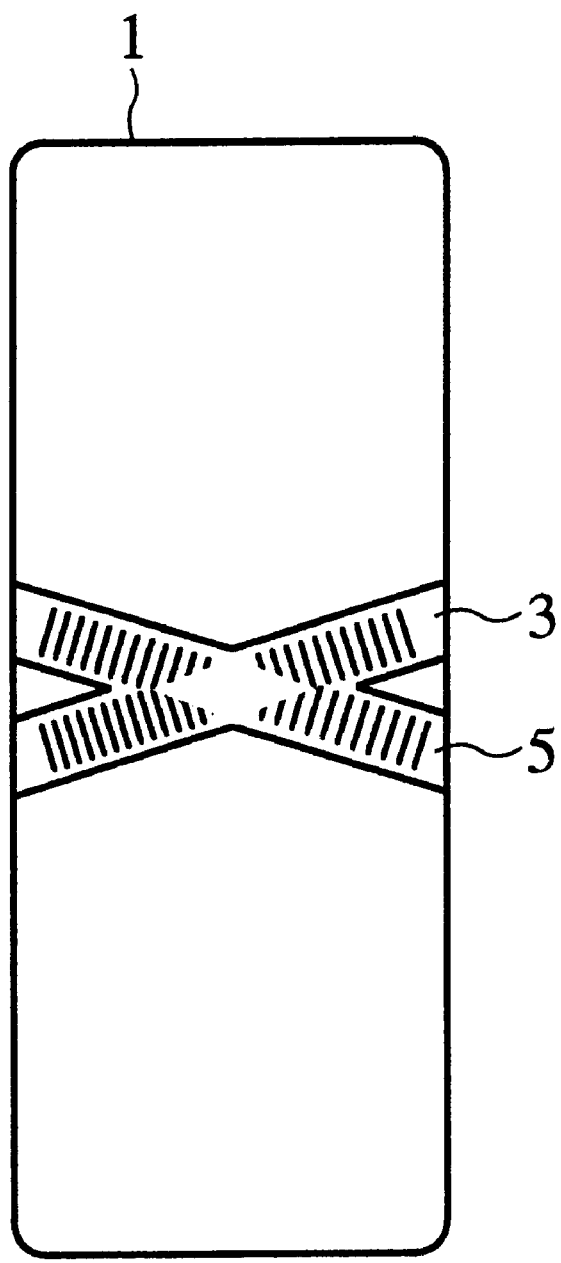
FIG. 9 is a diagram showing the remote control apparatus having the finger verification system according to a further modification of the first embodiment of the present invention.

Further, as shown in FIG. 9, it is permissible to allocate the grooves 3, 5 on the rear face of the remote control such that they cross each other. In this case, the electrodes of each groove are formed so that the center portions thereof are composed of short electrodes not so as to prevent short-circuit in the center portion.

In allocating the grooves on the rear face of the remote control apparatus, if an angle A between the grooves 3 and 5 is about 5–30° in FIG. 3C, the user can grip the remote control apparatus without any feeling of incongruity. Further, it is needless to say that four electrodes can be allocated on the rear and side faces of the remote control apparatus.

[Second embodiment]

According to the first embodiment, a plurality of the electrode faces are provided at positions easy for the finger on the side face or rear face of the remote control apparatus to make contact, so that personal recognition is automatically carried out without any particular user's consciousness thereby providing no stress to the user. However, because the user does not feel clearly that he has been recognized, a problem occurs.

For example, there can be considered a case in which user watches the pay channel unconsciously so that an unexpectedly high charge is requested at the time of liquidation. Another problem is that the pay channel includes programs unfavorable for low ages. When watching TV with children, if the pay channel is selected by mistake, the children come to watch a unfavorable program for low age group. In this case, even if the channel is switched in a hurry, an influence upon the children is not small. This embodiment provides a method for solving the above problem.

Figure 10:
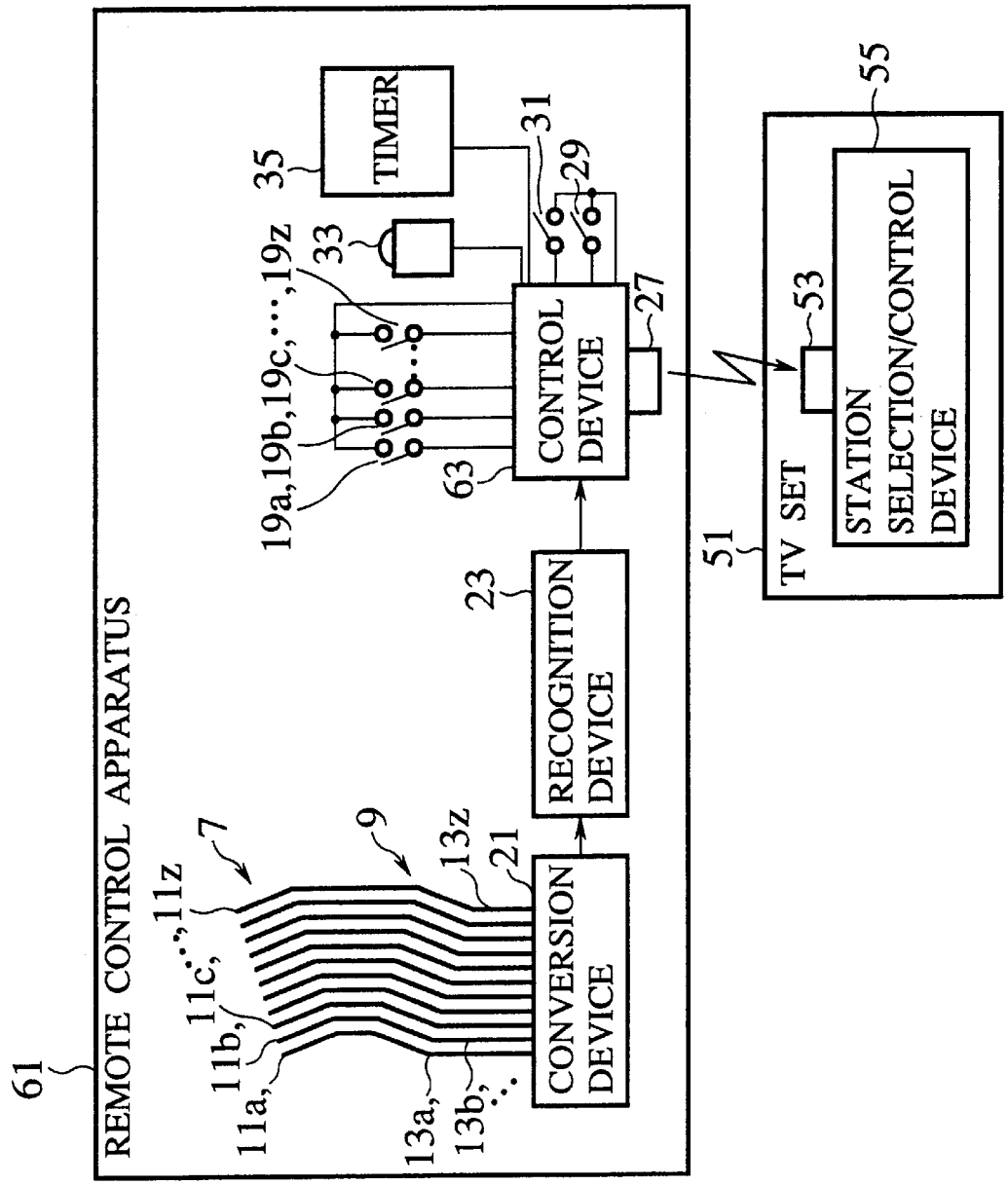
FIG. 10 is a block diagram showing the remote control apparatus having the finger verification system according to a second embodiment of the present invention.
Figure 11:
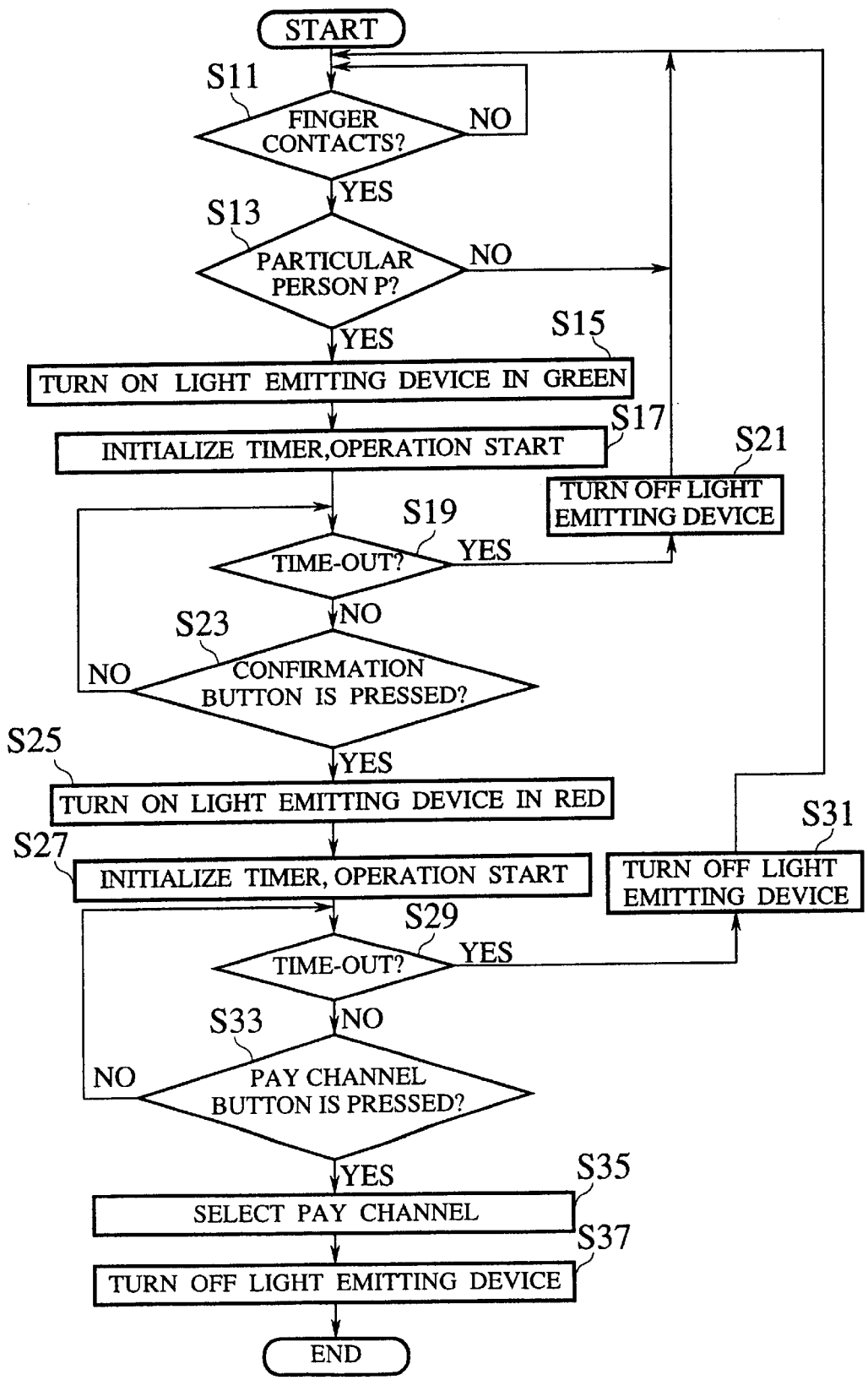
FIG. 11 is a flow chart for explaining an operation of the remote control apparatus having the finger verification system according to a second embodiment of the present invention.

FIG. 10 shows a block diagram showing a structure of a circuit according to a second embodiment of the present invention and FIG. 11 shows a flow chart for explaining the operation thereof. As for the second embodiment, the same reference numerals are attached to the components having the same function as the first embodiment and a description thereof is omitted.

Referring to a block diagram shown in FIG. 10, the remote control apparatus 61 comprises a plurality of electrodes 11a, 11b, 11c, ... 11z, a plurality of electrodes 13a, 13b, 13c, ... 13z, a conversion device 21, a recognition device 23 and a control device 63.

The control device 63 contains a light emitting device 33 for emitting red/green lights, timer 35, confirmation button 31, and pay channel button 29.

Next, referring to a flow chart shown in FIG. 11, an operation of the remote control apparatus according to the second embodiment will be described.

First, when an already registered particular person P grips the remote control apparatus 61, the resistance value between the adjacent electrodes 11a(13a) and 11z(13z) changes from open (substantially infinite) to several kΩ-several tens kΩ due to skin contact. The conversion device 21 determines that finger contact occurs (step S11) and successively measures a resistance between the adjacent electrodes. These resistance values are converted from analog to digital and the result is transmitted to the recognition device 23.

The recognition device 23 verifies a pattern registered in the recognition device 23 with a resistance pattern transmitted from the conversion device 21 so as to determine whether he is a particular person P (step S13). If he is the particular person P, the permission information notifying it is sent to the control apparatus 63.

If a notification that he is the particular person P as a result of the determination is received, the control apparatus 63 turns on the light emitting device 33, for example, in green (step S15) so as to notify the user that the pay channel is available. Next, the control device 63 initializes the timer 35 and starts the operation thereof (step S17).

After the operation of the timer 35 is started, the control device 63 loops the steps of time-out determination (step S19) and determining whether or not the confirmation button is pressed (step S23) so as to wait for any of such events.

Unless the confirmation button 31 is pressed within a first predetermined time interval after the light emitting device 33 turns green, time-out is determined at step S19, the light emitting device 33 is turned off (step S21) and even if the pay channel button 29 is pressed after that, it becomes invalid.

If the user wants to watch or listen to a pay channel with this green lamp turned ON, this confirmation button 31 is pressed. If the confirmation button 31 is pressed, a determination of step S23 is YES. The control device 63 changes the lighting from green to red or turns off green and turns on red (step S25), notifying that a user's response has been received, and then the processing is moved to step S27.

At step S27, the timer 35 is initialized so as to validate the pay channel button only within a second time interval so as to start the timer operation.

After the operation of the timer 35 is started, the control device 63 loops the steps of time-out determination (step S29) and determining whether or not the pay channel button has been pressed (step S29) so as to wait for any of such events.

If the pay channel button 29 is pressed within this second predetermined time interval so as to select the pay channel, the control device 33 transmits a control signal to the station selection/control device 55 so as to select a pay channel (step S35) and turns off the light emitting device 33 (step S37).

Unless the pay channel button is pressed within the second predetermined time interval, a determination of step S29 is time-out. Then, the light emitting device 33 is turned off (step S31) and even if the pay channel button 29 is pressed after that, it is invalid.

In the flow chart shown in FIG. 11, when the pay channel button 29 is pressed and the pay channel is controlled, this processing is terminated. However, there is a possibility that a wrong button may be pressed for the pay channel selection and it is troublesome to restart from the confirmation of finger contact. Then, within a predetermined time interval after the confirmation button 31 is pressed, it is permissible to enable changing of the channel.

With the finger verification system having such a structure, it is possible to prevent the pay channel from being selected by mistake. Further, even if user leaves there after the recognition device 23 transmits the permission signal, because the pay channel cannot be watched or listened to after a predetermined time interval, the pay channel is not watched or listened to by a third party. This is the same even after the confirmation button 31 is pressed.

Because the object of the light emitting device 33 is to notify that a particular person P has been recognized, it is needless to say that this means can be replaced by a sound producing means or both the means can be provided.

Although the light emitting device 33 of this embodiment is so structured to turn green when the recognition of a person is performed and turn red when the confirmation button is pressed, other ways are permitted because the object of this light is to notify a particular user. For example, it is permissible to so construct that it turns a certain color if the recognition is performed and it blinks in that color when the confirmation is carried out. Further, it is permissible to notify user by using on-screen display function of displaying a message on the screen of the TV set 51.

According to the present embodiment described above, by further providing a notifying means for notifying that a particular person has been recognized, if no response is received within a predetermined time interval since the recognition of a person, the operating function validated by a result of the personal recognition is invalidated. Thus, it is possible to provide a finger verification system excellent in user interface, capable of preventing an erroneous operation by notifying that automatic recognition has been completed.

[Third embodiment]

In a case when pay broadcasting charge is counted per hour or per piece of software, if TV is left ON, the charge continues to increase. Then, in a case when pay TV is watched, as an application of this embodiment, it is permissible to so construct that the TV is automatically turned off if the personal recognition is not carried out at every certain interval of time, e.g., every two hours. If the TV body has a button or the like for this operation, user must reach the TV, therefore it is troublesome. If this recognition can be performed through the remote control apparatus, user does not feel so much stress.

Figure 12:
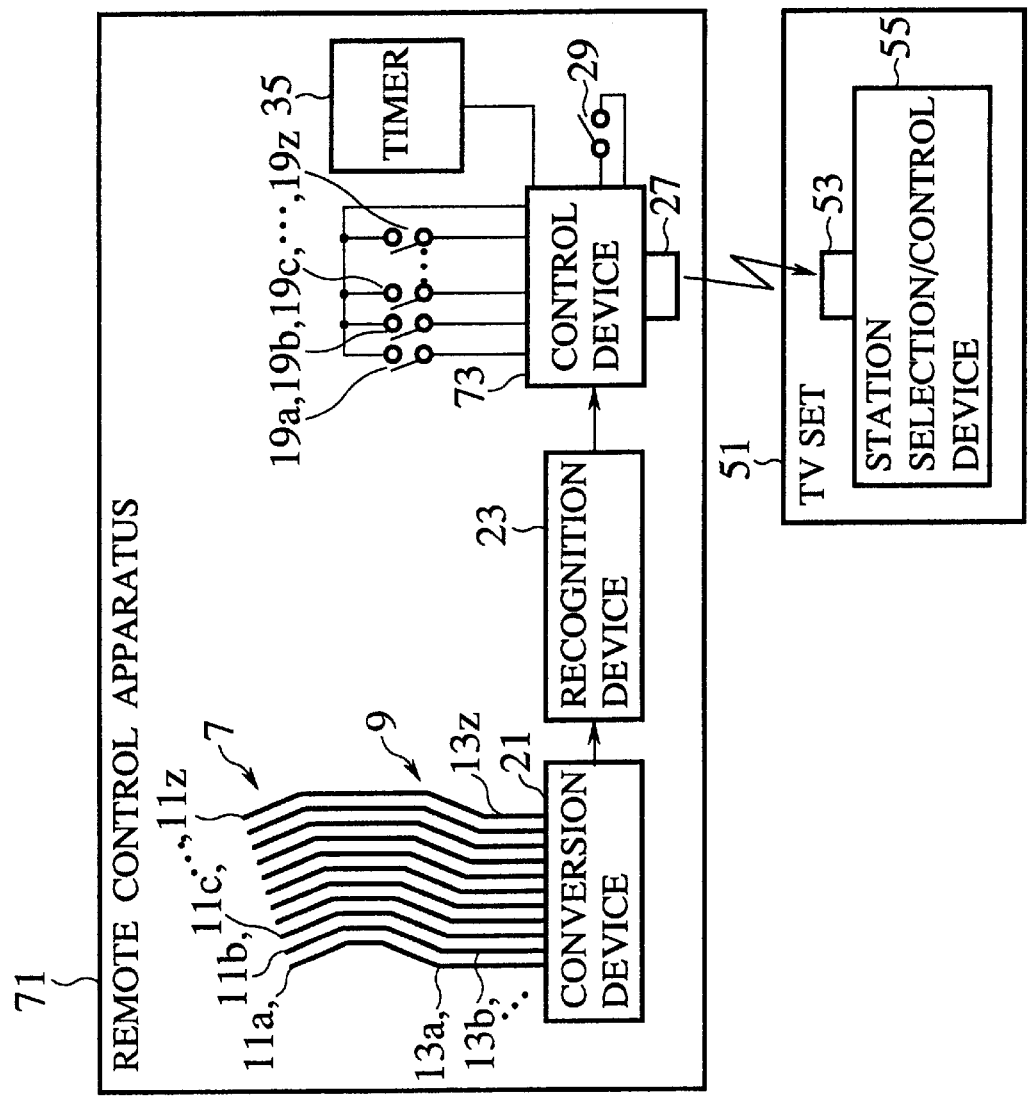
FIG. 12 is a circuit block diagram showing the remote control apparatus having the finger verification system according to a third embodiment of the present invention.

FIG. 12 shows a third embodiment of the present invention. To simplify a description thereof, this embodiment will be described based on the first embodiment, however it is possible to realize it if the second embodiment is combined. The same reference numerals are attached to the components having the same function as the first embodiment, and a description of a duplicate content is omitted.

A remote control apparatus 71 comprises a plurality of electrodes 11a, 11b, 11c, . . . 11z, a plurality of electrodes 13a, 13b, 13c, . . . 13z, a conversion device 21, a recognition device 23, and a control device 73.

The control device 71 contains a timer 35 and a pay channel button 29.

The structure and operation of the respective electrodes 11a(13a)–11z(13z), a conversion device 21 and a recognition device 23 are just the same as the first embodiment.

Assumes that a particular person P already registered grips the remote control apparatus 71 and then the recognition device 23 transmits a permission signal. The control device 73 starts the timer 35. When the pay channel button 29 is pressed, the control signal for instructing the station selection/control device 55 to select the pay channel is outputted. The timer 35 is reset and starts counting again if the power supply is turned off, the channel is changed or any other operation is carried out.

The timer 35 outputs a time information saying that a predetermined time has passed to the control device if the predetermined time, for example, an hour has passed. The control device 73 outputs an alarm information to the station selection/control device 55 according to that time information. The station selection/control device 55 multiplexes messages saying, for example, "the power supply will be turned off some minutes after" or "make recognition with remote control apparatus again".

If a particular person P grips the remote control apparatus within a certain time interval and a permission signal is inputted from the recognition device 23, the control device 73 resets the timer 35 and instructs the station selection/control device 55 to erase the aforementioned messages. Unless the permission signal is inputted within a predetermined time, the station selection/control device 55 is controlled to be turned off.

In the finger verification system having such a structure, even if a particular registered individual leaves the pay channel ON carelessly, the power is automatically turned off, so that unlimited increase of charge due to forgetting to turn off the power can be prevented. Further, it is prevent the pay TV from being watched by a unrelevant person because a registered person forgets to turn off.

Although the present invention is formed so that user is notified by sending a message to the TV screen, it is needless to say that this can be realized by other means. For example, by employing a light emission device, the other portion than the screen can be made to indicate or audio message produced by a buzzer or voice synthesizer may be used.

Further, if information indicating a beginning and end of a program is being transmitted from a broadcasting apparatus supplying the pay channel, it is possible to request the user to reconfirm by the aforementioned method when the program is ended.

[Fourth embodiment]

Figure 13:
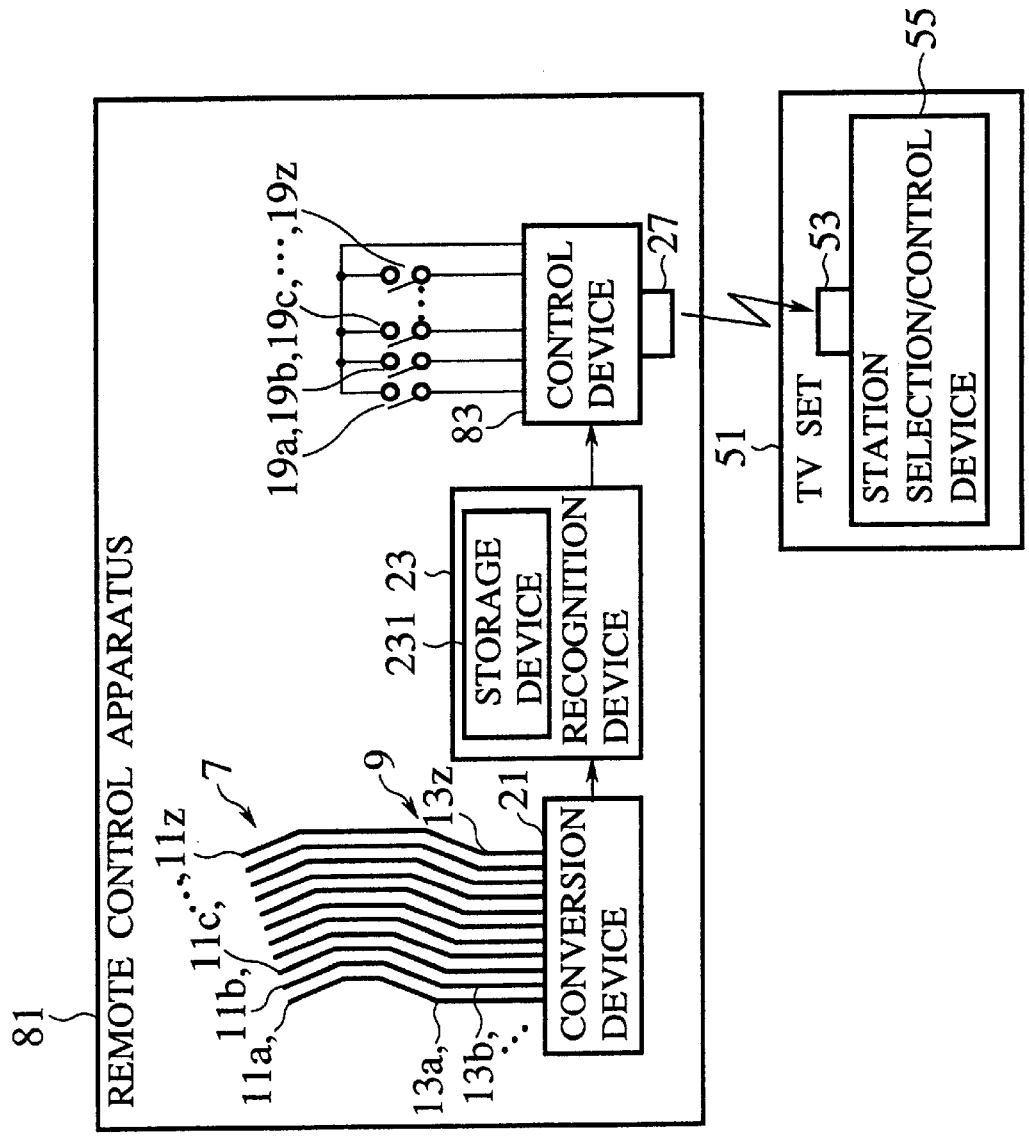
FIG. 13 is a circuit block diagram showing the remote control apparatus having the finger verification system according to a fourth embodiment of the present invention.

In the first, second and third embodiments, the case in which mainly a particular person has been recognized has been described. A fourth embodiment has an object of providing various services by recognizing plural persons. FIG. 13 shows a structure of the fourth embodiment.

Although this embodiment can be achieved by combining the second or third embodiment therewith, this will be described based on the first embodiment so as to simplify the description.

The remote control apparatus 81 comprises a plurality of electrodes 11a, 11b, 11c, . . . 11z, a plurality of electrodes 13a, 13b, 13c, . . . 13z, a conversion device 21, a recognition device 23 and a control device 83.

The structure and operation of the respective electrodes 11a(13a)–11z(13z) and the conversion device 21 are just the same as the first embodiment.

The recognition device 23 contains a storage unit 231 for storing data for recognizing a plurality of persons, and specifies a person gripping the remote control apparatus to send information to the control device 83. The control device 83 transmits control signal to the station selection/control device 55 according to this information, which controls a selection channel, sound volume, sound quality, picture quality and the like corresponding to each person.

For example, when a person having a weak acoustic sense grips the remote control apparatus, it is controlled so as to raise the sound level slightly. Generally, it has been recognized that aged persons have a lowered sensitivity to high range components in visual sense. Therefore, when the aged person uses it, it is convenient if the picture quality is controlled so that enhancer level is raised. As for channel selection, a channel which is automatically selected when the power is turned on can be set to a channel which everybody usually watches or listens to.

Further, TV watch time or time range can be restricted for children. For example, because TV game or the like compels a person to look fixedly at the screen, it is possible to consider restricting of daily use time or use time range or game play time or the like for children.

In this case, parent's finger is recognized so as to enable setting of various limitations. Further, it is possible to limit use time per month for only the pay broadcasting. Some pay TV services provide no-charge program for a short time. In this case, it is possible to limit the number of use for each person.

[Detection of finger pattern by electrostatic capacity]

In the first–fourth embodiments described above, electric resistances between plural electrodes are measured and according to this resistance pattern, personal recognition is carried out. However, electric resistance of the surface of skin changes largely by sweat or stain and contamination on the electrode face induces measurement error. Thus, in personal recognition based on a resistance by DC current, recognition rate may sometimes drop.

Then, according to the present invention, personal verification is enabled by a method applying electrostatic capacity as shown in FIG. 14. Further, an advantage of applying capacitive coupling is that when the finger is not in firm contact with an output electrode, capacitive coupling strength substantially reversely proportional to a distance between the finger and the output electrode is obtained so that an output voltage of a detecting circuit proportional to this coupling strength can be obtained. That is, in measurement of resistance, even when only a substantially infinite resistance can be obtained because there is no contact between the finger and electrode, the capacitive coupling is capable of obtaining a detecting circuit output reflecting an uneven shape of the finger. Thus, the amount of information increases so as to raise recognition accuracy.

FIG. 14 shows a conversion portion 300 for converting the finger shape to impedance pattern, which corresponds to the electrodes 11a, 11b, . . . 11z, 13a, 13b, . . . 13z and the conversion device 21 of FIG. 4.

Referring to FIG. 14, the conversion portion 300 comprises a plurality of output linear electrodes 200a, 200b, . . . 200z, 201a, 201b, . . . 201z, input electrodes 202a, 202b, a plurality of analog switches 203 which are selectively closed so as to apply a high frequency voltage upon the output linear electrodes, an oscillator 204 for supplying a fine high frequency current to the output linear electrodes through the analog switches 203, a timing pulse generator 205 for generating timing pulses for opening/closing the analog switches 203, a terminating resistor 208 connected between the input electrodes 202a, 202b and reference potential (grounding), a detecting circuit 206 for detecting a high frequency voltage of the terminating resistor 208 and an A/D converter 207 for A/D converting DC voltage outputted from the detecting circuit 206.

The finger is placed on a pair of the output linear electrodes 200a–200z and the input electrode 202a or a pair of the output linear electrodes 201a–200z and the input electrode 202b. At this time, the analog switch 203 is switched to a direction of the finger length so that an output of the oscillator 204 is successively connected to the output linear electrodes 200a–200z or the output linear electrodes 201a–201z. The high frequency output applied to the output linear electrodes 200a–200z or the output linear electrodes 201a–201z generates a high frequency voltage on both ends of the terminating resistor 208 one of which is connected to the input electrode 202a or 202b by the capacitive coupling between the finger shape and electrode. A generated high frequency voltage is detected by the detecting circuit 206 and converted to digital signal by the A/D converter 207. The timing pulse generator 205 generates a signal for controlling changeover of the analog switch 203 and sampling timing of the A/D converter 207.

At a portion where the finger in firm contact with the output electrode, the capacitive coupling between the finger and the output electrode is strengthened and the output voltage of the detecting circuit 206 increases. Conversely, at a portion where the finger is not in firm contact with the output electrode, the capacitive coupling between the finger and the output electrode weakens and the output voltage of the detecting circuit 206 drops. Accordingly, an output voltage corresponding to a distance between the finger and the electrode can be obtained.

Thus, the finger unevenness pattern can be detected according to digital signals obtained by the A/D converter 207, so that verification with the finger is enabled. The digital signal is transmitted to the recognition device 23 in FIGS. 4, 10, 12, and 13. The following processing is carried out in a common way in the first–fourth embodiments.

Because, according to the aforementioned method applying electrostatic capacity, the impedance of the input electrode 202 is required to be sufficiently low, an area of the input electrodes contacting the finger needs to be sufficiently larger than that of the output electrodes. Further, because the input electrodes need to be always in contact with the finger, they are desired to be located near the finger roots. Thus, in this case, the electrode shape is slightly different from a case in which electric resistance is used.

Figure 15A:
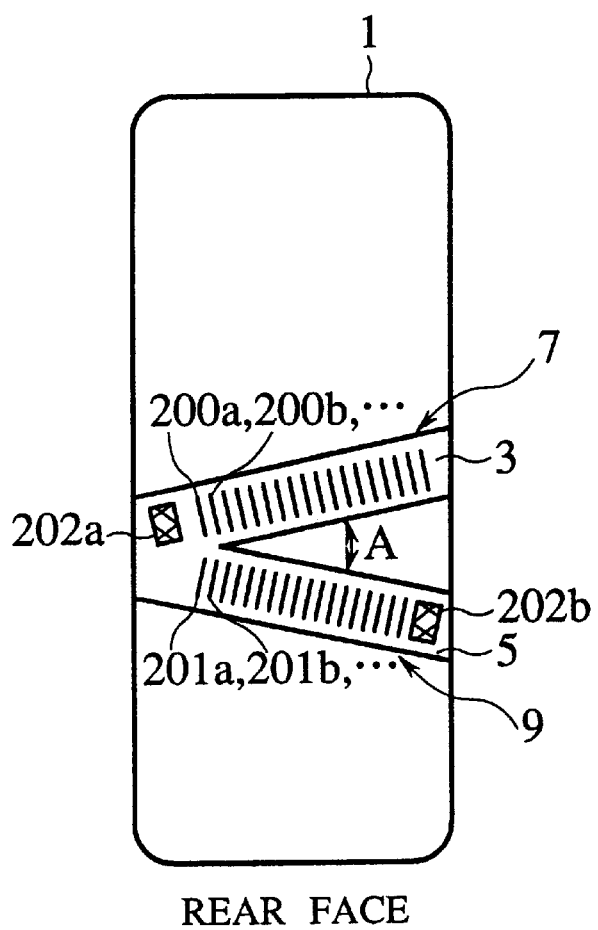
FIGS. 15A, 15B are diagrams showing a modification using impedance distribution measurement in the first embodiment.
Figure 15B:
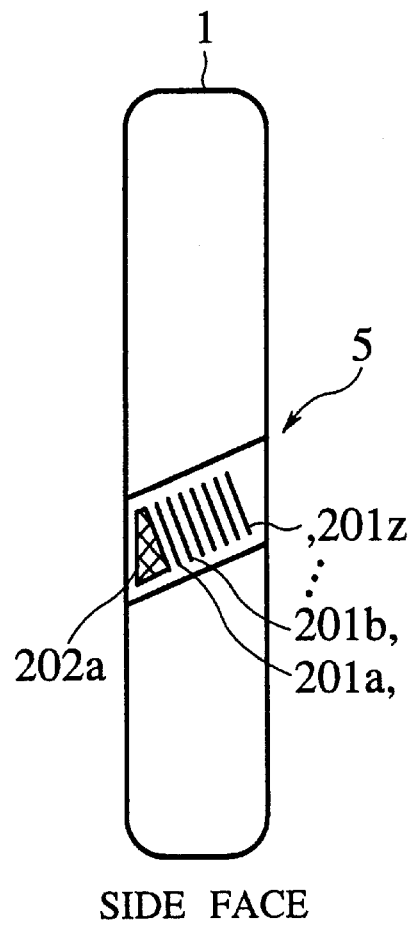
Figure 16A:
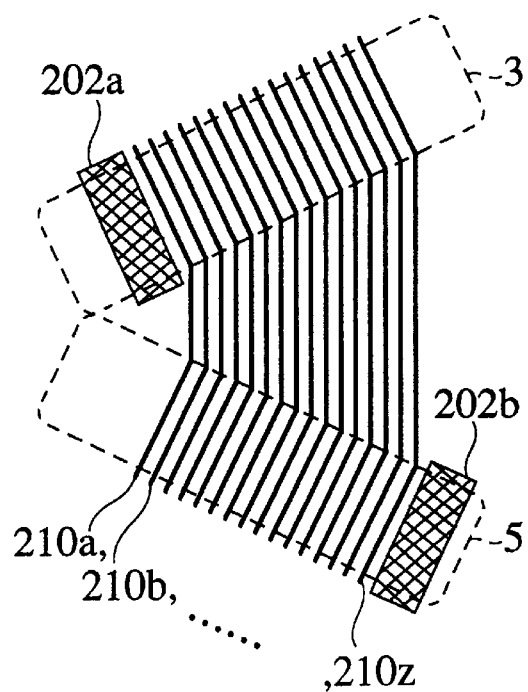
FIGS. 16A, 16B are diagrams showing a modification using impedance distribution measurement in the first embodiment.
Figure 16B:
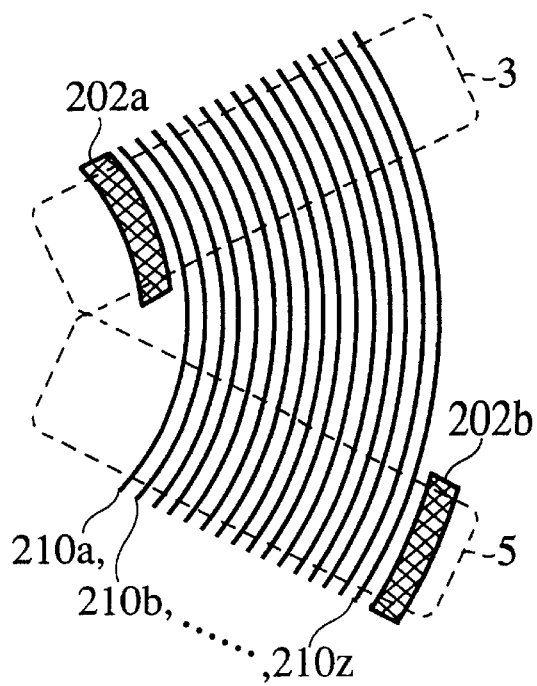

That is, in a case when such electrodes are allocated on the rear side of the remote control apparatus 1 shown in FIG. 3C, an arrangement shown in FIG. 15A is provided. Likewise, in a case when such electrodes are allocated on the side of the remote control apparatus 1 shown in FIGS. 6A, 6B, an arrangement shown in FIG. 15B is provided. Further, in a case when a single electrode plane is formed as shown in FIGS. 8A, 8B, the same effect can be obtained by forming curved electrodes in the manner shown in FIGS. 16A, 16B. Further, in a case when the electrode groups intersect each other at the center as shown in FIG. 9, the electrodes can achieve the same purpose.

[Fifth embodiment]

According to the first embodiment, by providing the rear face or the side face of the remote control apparatus, that is, a position where the finger located sideways can contact easily, with a plurality of the electrode faces, the verification is automatically performed regardless of user's consciousness so that the user does not feel stress. However, because the shape, size and the like of the hand differ largely depending on person, sometimes the groove fixedly provided may not correspond sufficiently to each need. According to the fifth embodiment, by providing grooves provided on the detecting face with a modification, a remote control apparatus improved in adaptability is provided.

Figure 18A:
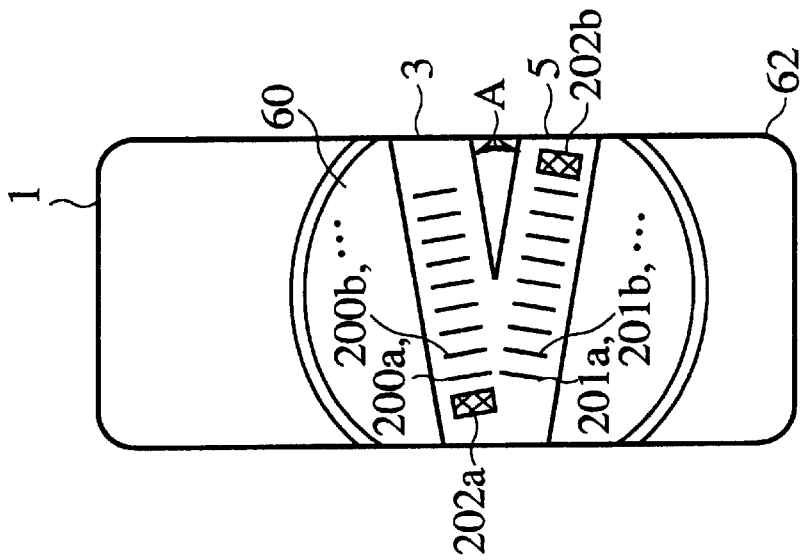
FIGS. 18A–18C are diagrams for explaining a rotation action in the fifth embodiment and a diagram showing the rear face of a case in which impedance measurement is used.
Figure 18B:
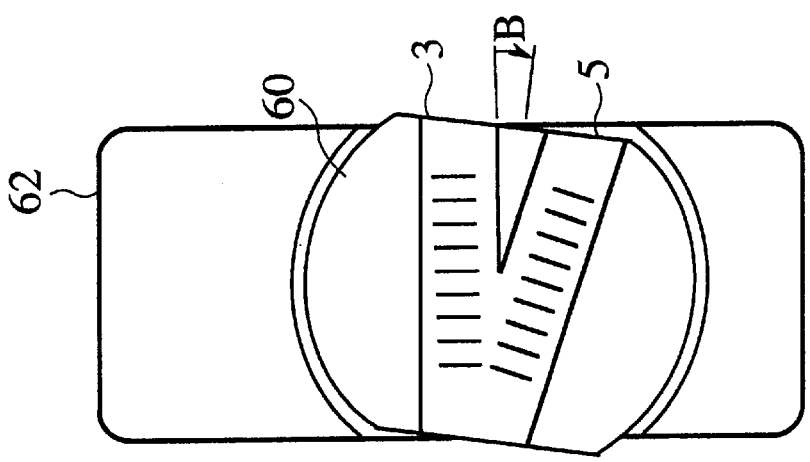
Figure 18C:
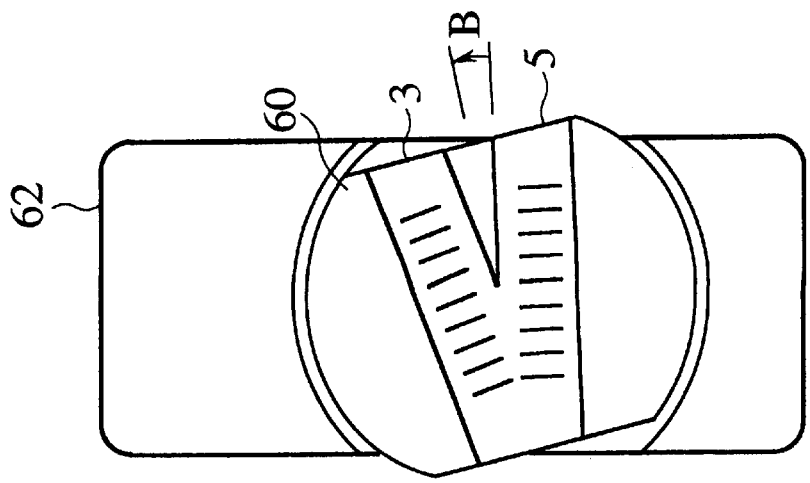

The fifth embodiment of the present invention is shown in FIGS. 17A–17C, 18A–18C. The basic structure is the same as the first embodiment and the same reference numerals are attached to the components having the same function, and a description thereof in detail is omitted. FIGS. 17A, 17B, 17C show the front face, the side face and the rear face thereof respectively and FIGS. 18A–18C show the rear faces.

As shown in FIGS. 17A–17C, the remote control apparatus 1 of the present embodiment comprises a main body 62 and a rotary body 60. As shown in FIGS. 17B, 17C, the rotary body 60 contains the electrode faces 7, 9 and the grooves 3, 5. Because a rotary shaft 61 supports the rotary body 60 rotatably relative to the main body 62, as shown in FIGS. 18A, 18B, the rotary body 60 can be rotated counterclockwise or clockwise only by a movable angle B relative to the rotary shaft 61. The movable angle B is provided so as to absorb a personal difference in the shape, size and the like of the hand, therefore if about 5° is preserved, it is sufficient. The conversion device 21 of FIG. 4 is contained in the rotary body 60 and generated signals are transmitted to the recognition device 23 of FIG. 4. If the present embodiment is applied to the case in which the verification is carried out by using electrostatic capacity as shown in FIG. 14, the allocation of the electrodes is slightly different as shown in FIG. 18C. That is, at one end of the output electrodes 200a–200z and 201a–201z respectively, the input electrodes 202a, 202b are allocated.

Here, if the rotary body 60 is rotated for fine adjustment, when the remote control apparatus is griped with an opposite hand, the angle in which the finger contacts may be deviated so that the user may feel a sense of incongruity. Then, when the remote control apparatus is released from the hand, it is desired that the rotary body 60 is returned to the center position.

For this purpose, a spring-back mechanism is provided, which returns the rotary body 60 to the center position when no load is applied to the rotary body 60. Generally, the same mechanism is used for dial mechanism for controlling rapid feed, feed back or the like in home VTR.

Figure 19A:
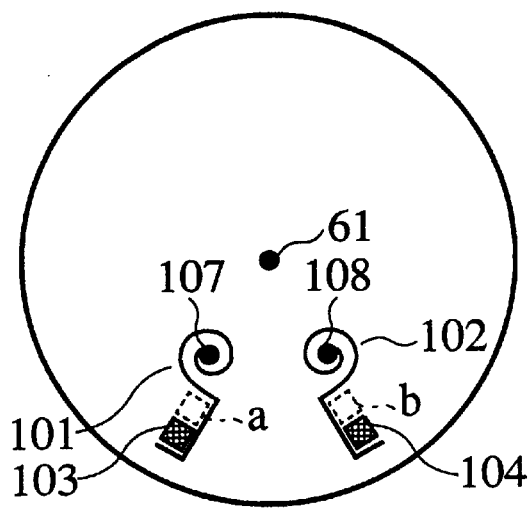
FIGS. 19A–19C are diagrams showing a structure of a spring-back mechanism which automatically returns the rotary body used in the fifth embodiment.
Figure 19B:
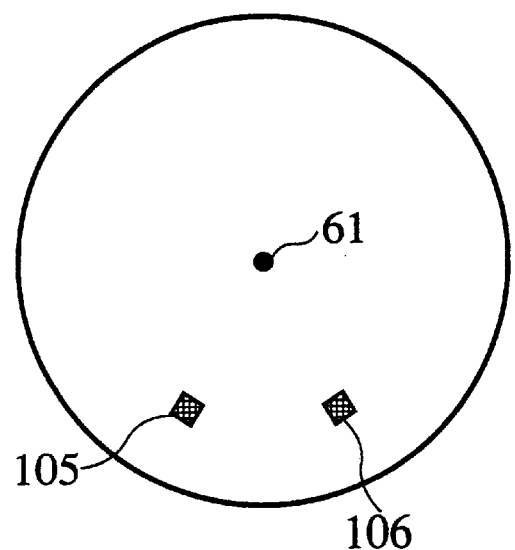
Figure 19C:
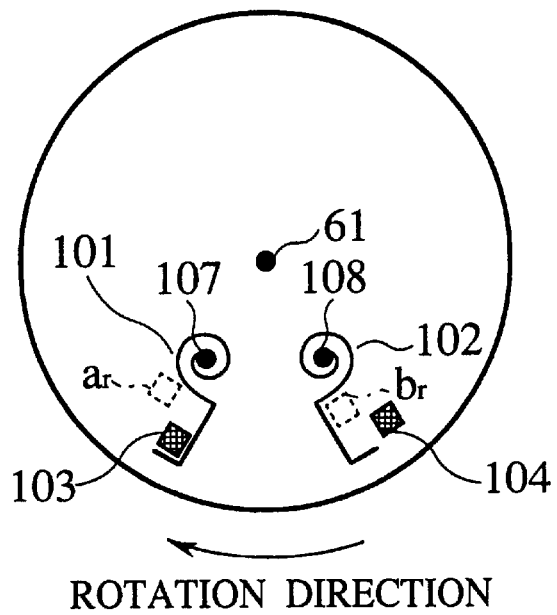

FIGS. 19A–19C shows an example of the spring-back mechanism. FIG. 19A shows the main body 62 and FIG. 19B shows the rotary body 60. The rotary shaft 61 is a center of the rotation. Each end of elastic bodies 101, 102 is fixed to fixing points 107, 108 so as to apply a force of returning clockwise/counterclockwise. Stoppers 103, 104 support the elastic bodies 101, 102 trying to return. On the other hand, the rotary body 60 has protrusions 105, 106. The protrusions 105, 106 are allocated so that they are located at positions a, b of FIG. 19A when the rotary body 60 matches the main body.

Therefore, the rotary body is as shown in FIG. 19A when a load in rotation direction is not applied. Assuming that a load is applied to the rotary body 60 in the clockwise direction, a state shown in FIG. 19C is produced. The protrusion 105 moves to the position $a_r$ while the protrusion 106 moves to the position br. Although the elastic body 107 is not changed relative to the state shown in FIG. 19A, a further load is applied to the elastic body 108 in the clockwise direction so that it tries to return in the counterclockwise direction. If the finger is released so as to release the load, the state of FIG. 19A is regained. If an opposite load is applied thereto, a force of returning to the state of FIG. 19A is generated by the elastic body 107 likewise.

Figure 21C:
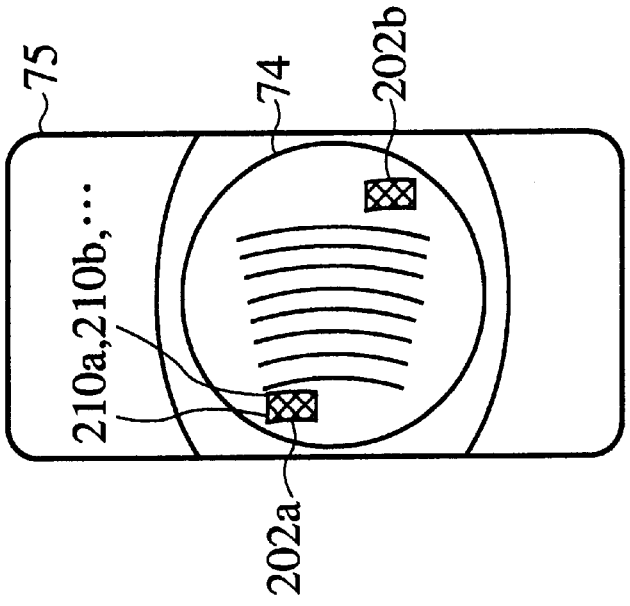
FIGS. 21A–21C are appearance diagrams showing a main body of the remote control apparatus according to a modification of the fifth embodiment.
Figure 21B:
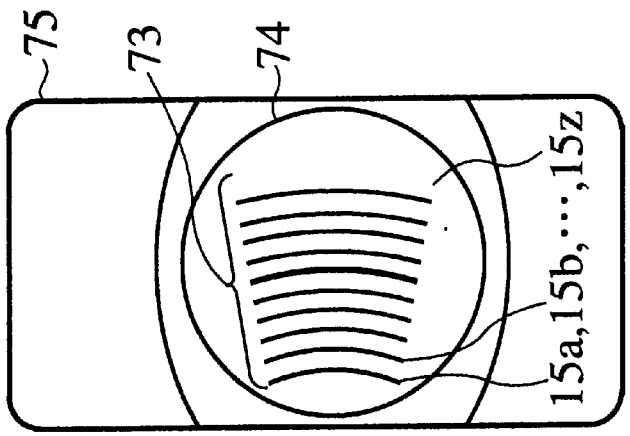
Figure 21A:
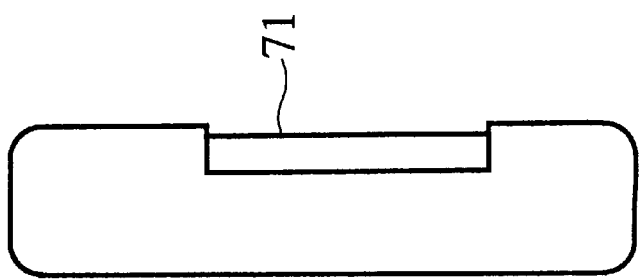
Figure 22A:
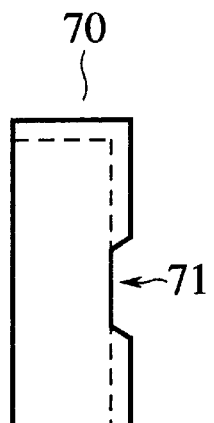
FIGS. 22A–22E are appearance diagrams showing a rotary body of the remote control apparatus according to a modification of the fifth embodiment.
Figure 22B:
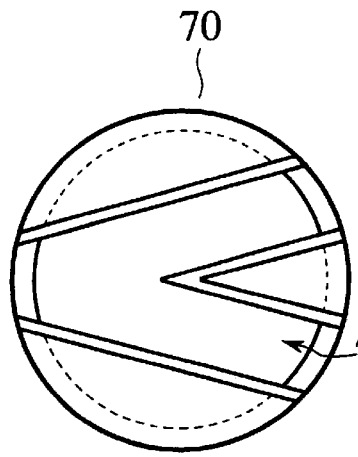
Figure 22C:
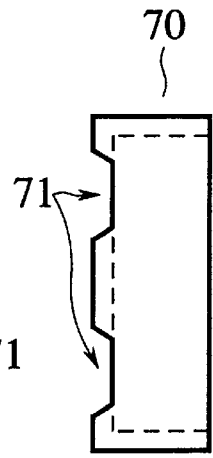
Figure 22D:
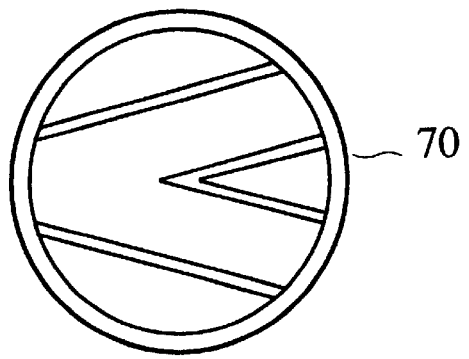
Figure 22E:
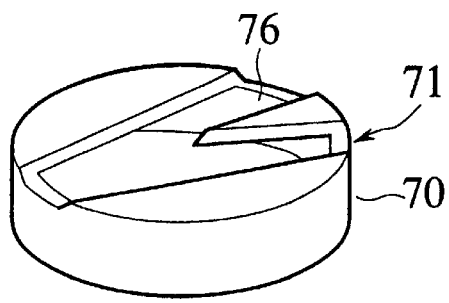

Examples in which the fifth embodiment is achieved with a simple structure are shown in FIGS. 20A–20D, 21A–21C and 22A–22E. According to the present embodiment, by a structure in which the electrodes and the like are fixed and only the grooves are movable, a simple structure can be achieved. FIG. 20A shows a front face, FIG. 20B shows a side face, FIG. 20C shows a rear face, FIG. 21A shows a side face of the main body 75 and FIG. 21B shows a rear face thereof. FIGS. 22A–22D show detailed views of the rotary body 70 and FIG. 22E shows a perspective view thereof.

Referring to FIG. 21B, the electrode 73 is allocated on a circular base plate 74 formed in the main body 75 of the remote control apparatus 1. The electrodes are allocated as shown by 15a, 15b, . . . 15z of FIG. 8B. As shown in FIGS. 22A–22E, the groove 71 of the rotary body 70 has V-shaped hole 76.

The rotary body 70 covers the base plate 74 such that it is movable in only the rotation direction. When the finger is placed in the groove 71, the finger surface contacts the electrodes 15a, 15b, . . . 15z through the V-shaped hole 76 so as to enable the aforementioned verification.

In the present embodiment also, like the examples shown in FIGS. 17A–17C and 18A–18C, when the hand leaves the remote control apparatus, the rotary body is desired to return to the center position. It is needless to say that use of the aforementioned spring-back mechanism shown in FIGS. 19A–19C makes it possible to realize that easily. In this case, according to the present embodiment, the rotary body 70 covers the base plate 74 so as to secure a movement in the rotation direction. Thus, the rotary shaft 61 is not necessary. In making the recognition by applying the electrostatic capacity as shown in FIG. 14 even in the present embodiment, the allocation of the electrodes is slightly different, such that the input electrodes 202a, 202b are disposed at each end of the plural electrodes 200a–200z, 201a–201z. The appearances of the rear face are shown in FIGS. 20D, 21C. In any cases, the circuit diagram shown in FIG. 14 can be applied to connection between the electrode groups and conversion device.

[Sixth embodiment]

According to the sixth embodiment, the aforementioned problem is solved by moving the detecting surface vertically depending on the shape, size and the like of the hand so as to correspond to a personal difference. FIGS. 23–26 show examples in which the detecting face is allocated on the rear face of the remote control apparatus 1. FIGS. 23A–23C and 24A–24B show the main body 84 of the remote control apparatus 1 and FIGS. 25A, 25B and 26 show a detail of the movable portion 81.

FIGS. 23A, 23B, 23C, 24A, and 24B show the front face, side face, and rear face and side face and rear face of the main body 84. FIG. 25A shows a detail of the movable portion 81 and FIG. 25B shows a perspective view thereof.

The present embodiment comprises the main body 84 and movable portion 81. As shown in FIGS. 23B, 23C, the center portion of the main body 84 is dented such that it is formed in a substantially concave shape. As evident from FIGS. 25A, 25B, the movable portion 81 is formed in a substantially convex shape if the side portion is excluded. Therefore, the movable portion 81 is capable of moving on slide faces 82, 83 of the main body 84 shown in FIGS. 24A, 24B.

Figure 25A:
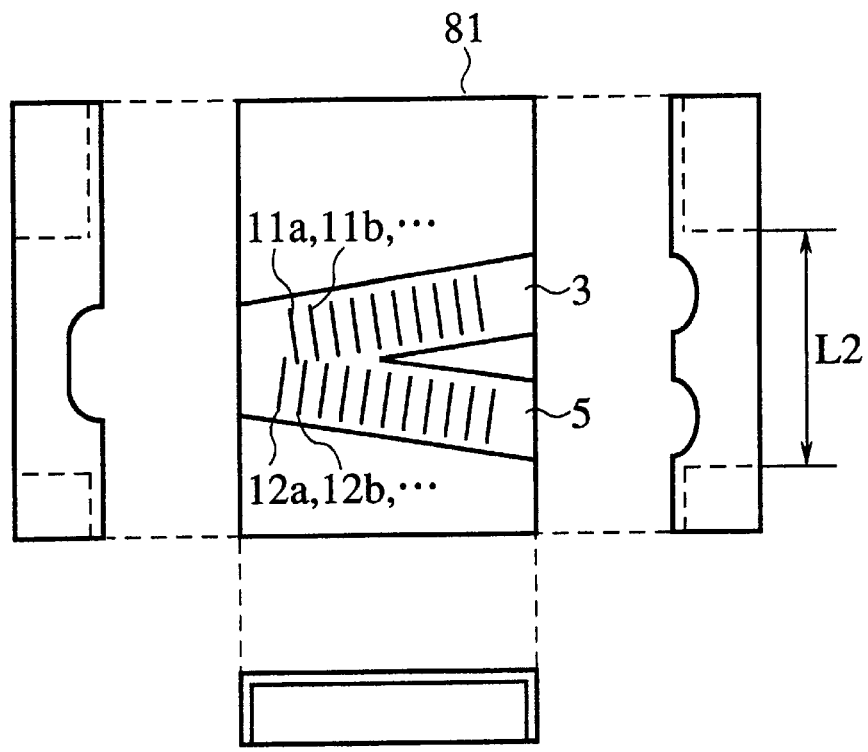
FIGS. 25A, 25B are appearance diagrams showing a shape of a movable portion of the remote control apparatus according to the sixth embodiment.
Figure 25B:
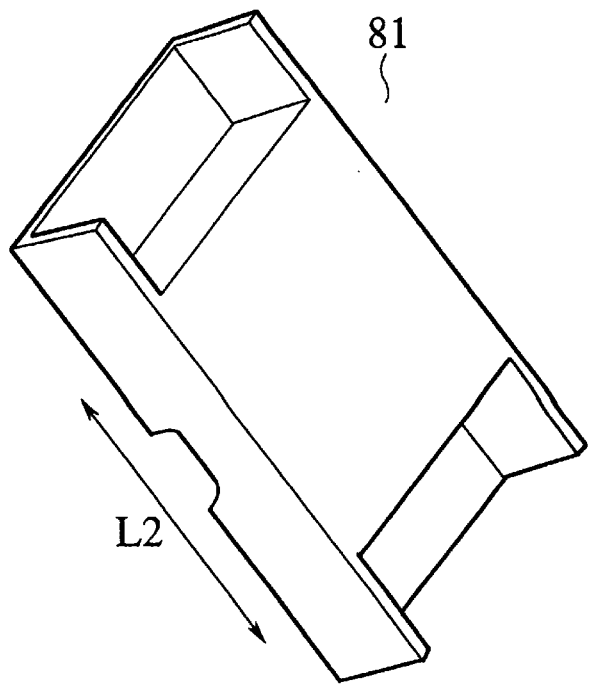
Figure 26:
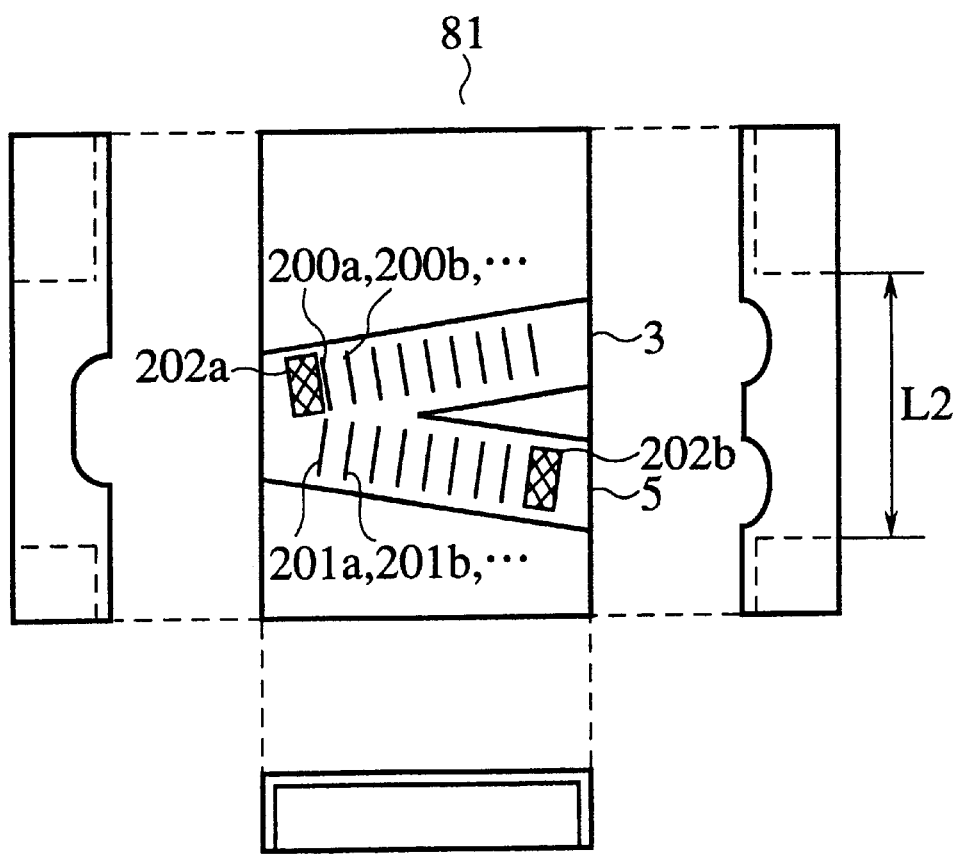
FIG. 26 is an appearance diagram showing a shape of the movable portion of the remote control apparatus according to the sixth embodiment.

Here, the length L1 of FIG. 24B and the length L2 of FIG. 25A, 26 have a relation of L1>L2. In a state shown in FIG. 23C by combining the main body 84 with the movable portion 81, the movable portion 81 is movable in the length of (L1–L2). That is, the user can move the movable portion 81 within the length of (L1–L2) freely so as to adjust.

The conversion device 21 and recognition device 23 of FIG. 4 are incorporated in the movable portion 81. The permission information obtained from the recognition device 23 is transmitted to the control device 25. A following processing is carried out in the same manner as the first--fourth embodiments.

Figures 27A, 27B, 27C:
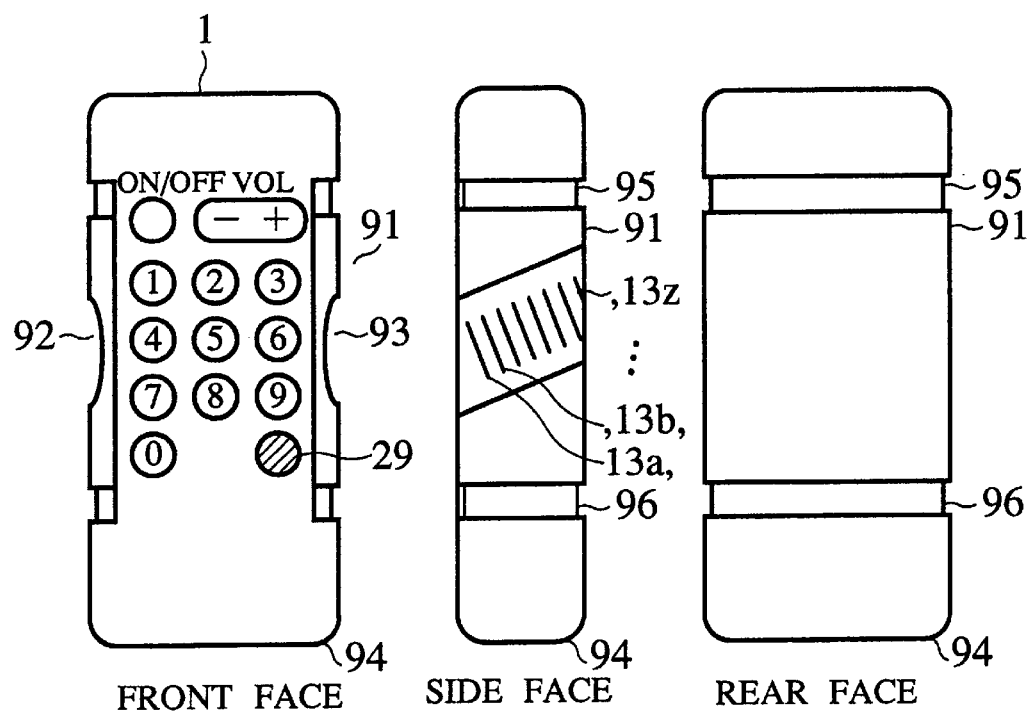
FIGS. 27A–27D are appearance diagrams showing the remote control apparatus according to a modification of the sixth embodiment.

FIGS. 27A–30 show examples in which the detecting face allocated on the side face of the remote control apparatus 1 is moved vertically. FIGS. 27A, 27B, 27C show the front face, side face and rear face thereof respectively, and FIGS. 28A, 28B, 28C show the front face, side face and rear face of the main body 94. FIG. 29A is a detailed diagram of the movable portion 91 and FIG. 29B is a perspective view of the movable portion 91.

According to the present embodiment, the remote control apparatus 1 comprises a main body 94 and a movable portion 91. Grooves 92, 93 of the movable portion 91 correspond to the grooves 3, 5 of FIG. 6A of the first embodiment. As evident from FIG. 28B, the center portion of the main body 94 is dented as viewed from the side, such that the dented portion is substantially concave. As evident from FIGS. 29A, 29B, 30, the movable portion 91 is substantially convex if the side portion thereof is excluded. Therefore, the movable portion 91 moves on slide faces 95, 96 of the main body 94 of FIGS. 27A–27C.

Figure 29A:
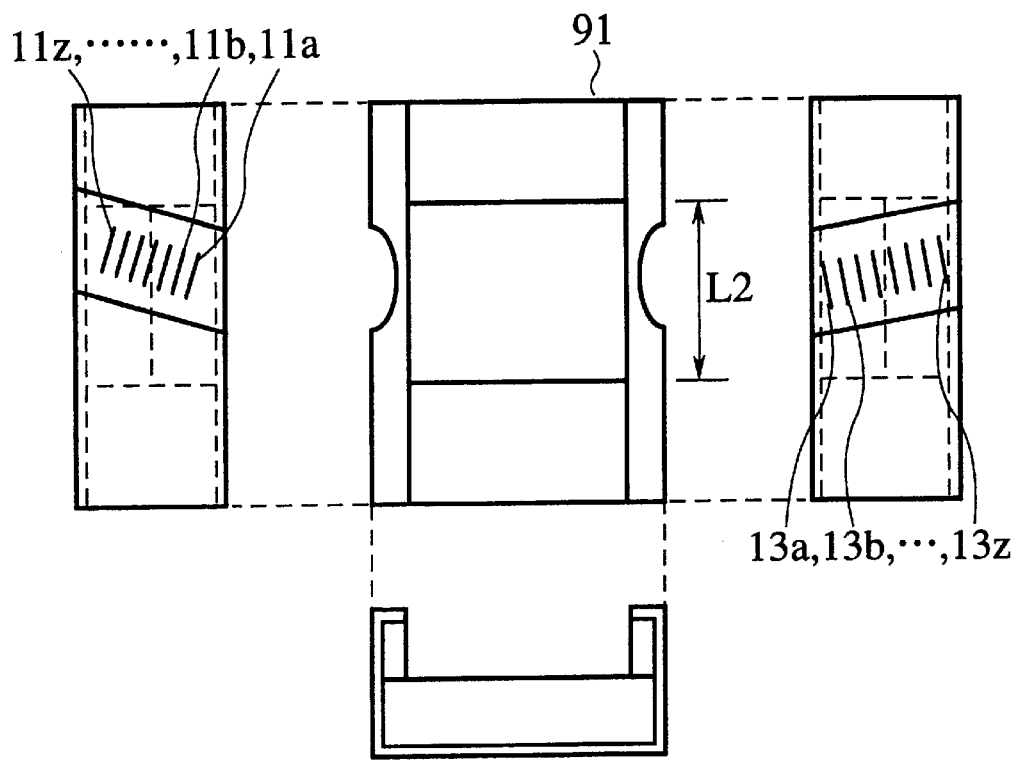
FIGS. 29A, 29B are appearance diagrams showing a shape of the movable portion of the remote control apparatus according to a modification of the sixth embodiment.
Figure 29B:
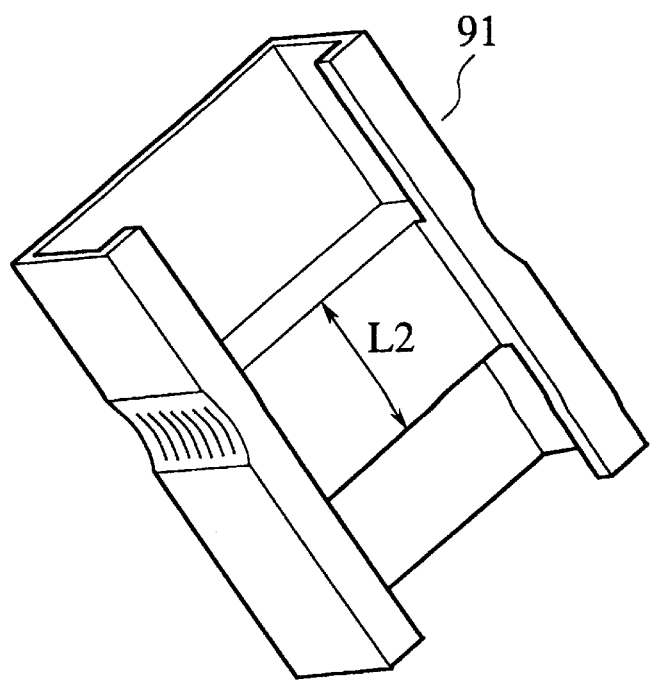
Figure 30:
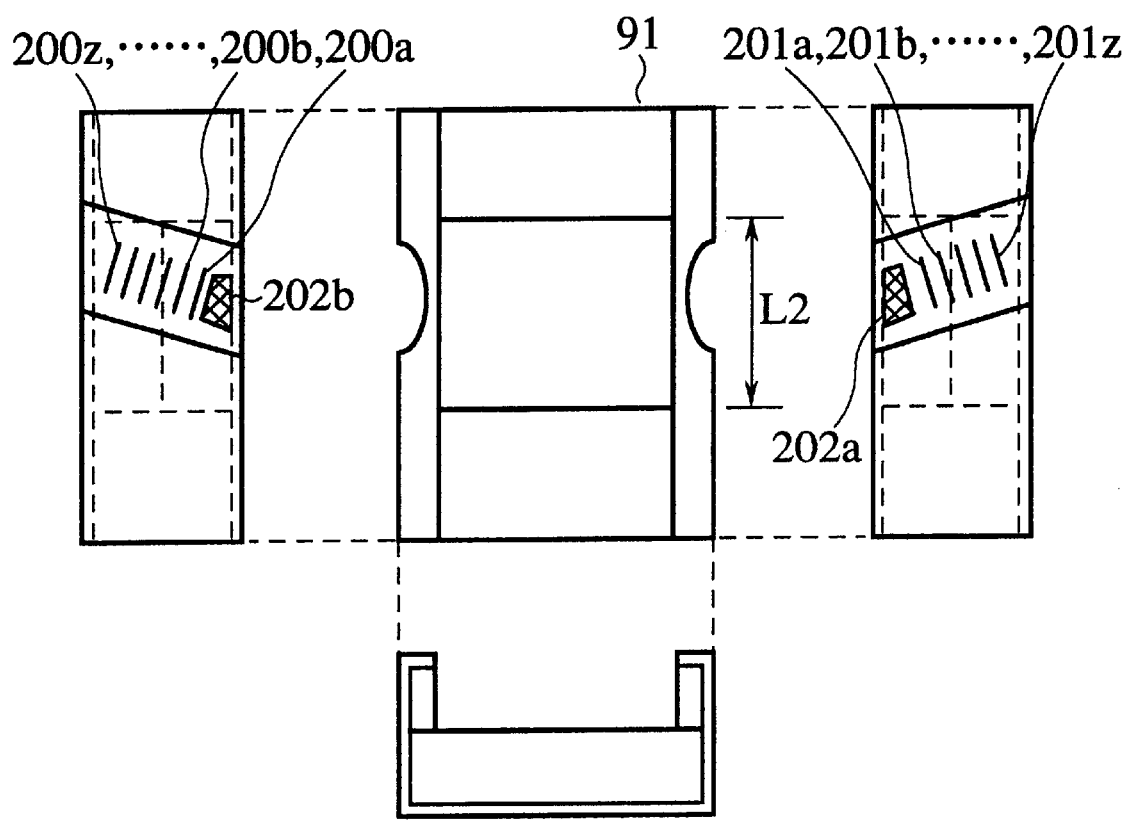
FIG. 30 is an appearance diagram showing a shape of the movable portion of the remote control apparatus according to a modification of the sixth embodiment.

Here, the length L1 of FIG. 28B and the length L2 of FIGS. 29A, 29B and 30 have a relation of L1>L2. When a state shown in FIGS. 27A–27C is obtained by combining the main body 94 with the movable portion 91, the length of (L1–L2) is a length in which the movable portion 91 can move. That is, user can move the movable portion 91 freely within the length of (L1–L2) so as to adjust. The conversion device 21 and recognition device 23 of FIG. 4 are incorporated in the movable portion 91, so that they are operated in the same manner.

In a case when the movable portion having grooves on the side thereof is so structured as to be movable in back and forth direction relative to the main body, there may be a case in which the apparatus is hard to grip because the movable portion moves under a small load. Therefore, by using such a mechanism capable of gradually setting a position of the movable portion relative to the main body semi-fixedly, setting it once makes the movable portion hard to move, thereby solving such a problem.

Figure 31:
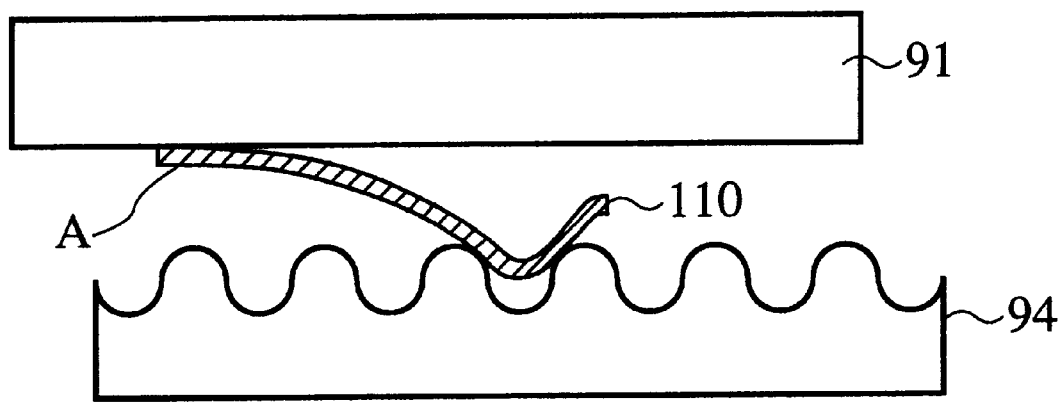
FIG. 31 is an explanatory view of a slide fixing mechanism for use in the remote control apparatus according to a modification of the sixth embodiment.

FIG. 31 shows an example in which a vertical position can be gradually set. An elastic body 110 is fixed to part of the movable portion 91 at a fixing position. Part of the main body 94 shows a wave shape as shown in FIG. 31 and part of the elastic body 110 contacts the main body 94. Thus, the movable portion 91 is stabilized by concave portion of this wave shape portion by a repelling force of the elastic body 110. That is, the user can select an optimum position from any concave portions depending on the size, shape, and the like of the hand.

Figure 27D:
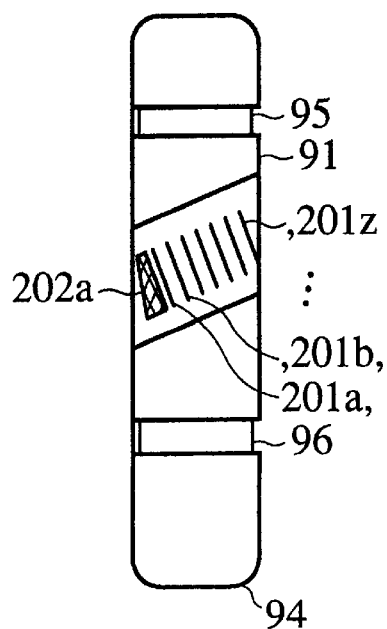

In a case when the verification is performed using electrostatic capacity in the present embodiment like the fifth embodiment, the allocation of the electrodes is slight different. FIG. 23D shows an appearance of a case in which the electrodes disposed on the rear face of the remote control apparatus 1 are movable vertically, and FIG. 26 is a detailed drawing of the movable portion 81. Further, a similar structure is applied when the electrodes are disposed on the side face of the remote control apparatus 1 such that they are movable vertically. FIG. 27D shows a side face and FIG. 30 shows a detail of the movable portion 91. In any cases, input electrodes 202a, 202b are disposed at each end of the plural output electrodes 200a–200z, 201a–201z. Then, the circuit diagram shown in FIG. 14 can be applied to connection between the electrodes and conversion device.

It should be understood that many modifications and adaptations of the invention will become apparent to those skilled in the art and it is intended to encompass such obvious modifications and changes in the scope of the claims appended hereto.

What is claimed is:

1. A finger verification system comprising:
    a case having two grooves disposed on a rear face thereof, said grooves being located on said rear face so as to correspond to a natural position and contour of fingers clutching said case, and an angle formed by said grooves being 5 degrees to 30 degrees;
    electrode faces which are provided in each of said grooves and formed with electrodes arranged in the same direction as an extension direction of said grooves; and
    a recognition means for, when a finger makes a contact with any of said electrode faces, recognizing a particular person related to said finger according to an impedance distribution pattern group obtained by measurement based on said electrodes.

2. A finger verification system comprising:
    a case having a plurality of grooves disposed on a rear face thereof;
    a plurality of electrode faces which are provided in each of said plurality of the grooves and formed with a plurality of electrodes arranged in the same direction as an extension direction of said plurality of the grooves; and
    a recognition means for, when a finger makes a contact with any of said plurality of the electrode faces, recognizing a particular person related to said finger according to an impedance distribution pattern group obtained by measurement based on said plurality of the electrodes, wherein said case is provided with said plurality of the grooves on the rear face thereof and contains a rotary body rotatable around a shaft vertical to the rear face.

3. A finger verification system according to claim 2 further comprising a spring-back mechanism which positions said rotary body at a predetermined position under no load condition and when a load is applied in any direction of normal and reverse directions, rotates said rotary body in the direction of said load from said predetermined position and when said load is removed, returns said rotary body to said predetermined position.

4. A finger verification system comprising:
- a case having two grooves disposed on a rear face thereof, an angle formed by said grooves being 5 degrees to 30 degrees;
- electrode faces which are provided in each of said grooves and formed with electrodes arranged in the same direction as an extension direction of said grooves; and
- a recognition means for, when a finger makes a contact with any of said electrode faces, recognizing a particular person related to said finger according to an impedance distribution pattern group obtained by measurement based on said electrodes,
- wherein said case is provided with said grooves on the rear face thereof and contains a rotary body rotatable around a shaft vertical to the rear face.

5. A finger verification system according to claim 4, further comprising a spring-back mechanism which positions said rotary body at a predetermined position under no load condition and when a load is applied in any direction of normal and reverse directions, rotates said rotary body in the direction of said load from said predetermined position and when said load is removed, returns said rotary body to said predetermined position.

6. A finger verification system comprising:
- a case having a plurality of grooves disposed on a rear face thereof, said grooves being located on said rear face so as to correspond to a natural position and contour of fingers clutching said case, angles formed by said plurality of the grooves being 5 degrees to 30 degrees;
- electrode faces which are provided in each of said plurality of the grooves and formed with electrodes arranged in the same direction as an extension direction of said plurality of the grooves; and
- a recognition means for, when a finger makes a contact with any of said electrode faces, recognizing a particular person related to said finger according to an impedance distribution pattern group obtained by measurement based on said electrodes.

7. A finger verification system comprising:
- a case having a plurality of grooves disposed on a rear face thereof, angles formed by said plurality of the grooves being 5 degrees to 30 degrees;
- electrode faces which are provided in each of said plurality of the grooves and formed with electrodes arranged in the same direction as an extension direction of said plurality of the grooves; and
- a recognition means for, when a finger makes a contact with any of said electrode faces, recognizing a particular person related to said finger according to an impedance distribution pattern group obtained by measurement based on said electrodes,
- wherein said case is provided with said plurality of the grooves on the rear face thereof and contains a rotary body rotatable around a shaft vertical to the rear face.

8. A finger verification system comprising:
- a case having a plurality of grooves disposed on a rear face thereof, angles formed by said plurality of the grooves being 5 degrees to 30 degrees, wherein said case contains a rotary body rotatable around a shaft vertical to the rear face;
- electrode faces which are provided in each of said plurality of the grooves and formed with electrodes arranged in the same direction, as an extension direction of said plurality of the grooves;
- a recognition means for, when a finger makes a contact with any of said electrode faces, recognizing a particular person related to said finger according to an impedance distribution pattern group obtained by measurement based on said electrodes; and
- a spring-back mechanism which positions said rotary body at a predetermined position under no load condition and when a load is applied in any direction of normal and reverse directions, rotates said rotary body in the direction of said load from said predetermined position and when said load is removed, returns said rotary body to said predetermined position.

9. A finger verification system comprising:
- a case having a plurality of grooves disposed on a rear face thereof, said grooves being located on said rear face so as to correspond to a natural position and contour of fingers clutching said case;
- electrode faces which are provided in each of said plurality of the grooves and formed with electrodes arranged in the same direction as an extension direction of said plurality of the grooves; and
- a recognition means for, when a finger makes a contact with any of said plurality of the electrode faces, recognizing a particular person related to said finger according to an impedance distribution pattern group obtained by measurement based on said electrodes.

* * * * *